(12) United States Patent
Ophardt et al.

(10) Patent No.: US 10,230,120 B2
(45) Date of Patent: Mar. 12, 2019

(54) DIRECT ISOPROPANOL FUEL CELL

(71) Applicant: OP-Hygiene IP GMBH, Niederbipp (CH)

(72) Inventors: Heiner Ophardt, Arisdorf (CH); Volker Loos, Sankt Wendel (DE); Gregor Hoogers, Trier (DE); Albrecht Lang, Niederbipp (CH)

(73) Assignee: OP-Hygiene IP GmbH, Niederbipp (CH)

( * ) Notice: Subject to any disclaimer, the term of this patent is extended or adjusted under 35 U.S.C. 154(b) by 306 days.

(21) Appl. No.: 15/292,560

(22) Filed: Oct. 13, 2016

(65) Prior Publication Data

US 2017/0110750 A1 Apr. 20, 2017

(30) Foreign Application Priority Data

Oct. 14, 2015 (CA) ...................... 2909013

(51) Int. Cl.

| | |
|---|---|
| *H01M 8/06* | (2016.01) |
| *H01M 8/1011* | (2016.01) |
| *H01M 8/1025* | (2016.01) |
| *H01M 8/04089* | (2016.01) |
| *H01M 8/04537* | (2016.01) |
| *H01M 8/04746* | (2016.01) |
| *H01M 4/88* | (2006.01) |
| *H01M 4/92* | (2006.01) |
| *H01M 8/04186* | (2016.01) |
| *H01M 8/04082* | (2016.01) |
| *H01M 8/04828* | (2016.01) |
| *H01M 8/1018* | (2016.01) |

(52) U.S. Cl.
CPC ........ *H01M 8/1013* (2013.01); *H01M 4/881* (2013.01); *H01M 4/92* (2013.01); *H01M 8/04089* (2013.01); *H01M 8/04186* (2013.01); *H01M 8/04216* (2013.01); *H01M 8/04544* (2013.01); *H01M 8/04634* (2013.01); *H01M 8/04753* (2013.01); *H01M 8/04761* (2013.01); *H01M 8/04828* (2013.01); *H01M 8/1025* (2013.01); *H01M 2008/1095* (2013.01); *Y02E 60/522* (2013.01)

(58) Field of Classification Search
CPC ........... H01M 8/1013; H01M 8/04089; H01M 8/04186; H01M 8/04216; H01M 8/04544; H01M 8/04634; H01M 8/04753; H01M 8/04761; H01M 8/04828; H01M 4/881; H01M 4/92; H01M 2008/1095
See application file for complete search history.

(56) References Cited

U.S. PATENT DOCUMENTS

| | | |
|---|---|---|
| 5,836,482 A | 11/1998 | Ophardt et al. |
| 6,875,539 B2 | 4/2005 | Ophardt |
| 7,687,428 B1 | 3/2010 | Zhong et al. |

(Continued)

OTHER PUBLICATIONS

Vira Mehta; Joyce Smith Cooper; Journal of Power Sources, vol. 114, Issue 1, pp. 32-53.

(Continued)

*Primary Examiner* — Jane J Rhee
(74) *Attorney, Agent, or Firm* — Thorpe North and Western, LLP

(57) ABSTRACT

A direct isopropanol fuel cell adapted for use in ambient conditions and utilizing as fuel isopropanol and water preferably with isopropanol at relatively high concentrations representing 30% to 90% isopropanol.

20 Claims, 20 Drawing Sheets

(56) References Cited

U.S. PATENT DOCUMENTS

| | | |
|---|---|---|
| 8,684,236 B2 | 4/2014 | Ophardt |
| 8,871,393 B1 | 10/2014 | Liu et al. |
| 2004/0001979 A1 | 1/2004 | Qi et al. |
| 2006/0172160 A1 | 8/2006 | Min et al. |
| 2007/0224468 A1 | 9/2007 | Akiyama et al. |
| 2007/0281200 A1 | 12/2007 | Tanaka et al. |
| 2010/0003550 A1 | 1/2010 | Sato |
| 2011/0108410 A1 | 5/2011 | Ophardt |

OTHER PUBLICATIONS

Grigorii L. Solovechik, Beilstein J. Nanotechnol—Liquid Fuel Cells, 2014—vol. 5; pp. 1399-1418.

DIRECT ISOPROPANOL FUEL CELL

SCOPE OF THE INVENTION

This invention relates to direct isopropanol fuel cells and, more particularly, an arrangement for a direct isopropanol fuel cell and a method of operating the same.

BACKGROUND OF THE INVENTION

Direct alcohol fuel cells are known, and methanol is one of the most common fuels for direct alcohol fuel cells.

The present applicant has appreciated that isopropanol is a fuel which can advantageously be used in direct alcohol fuel cells. Isopropanol has advantages that it is relatively inexpensive. Isopropanol has a low relative toxicity. Isopropanol is mixable with water. The present applicants have appreciated that direct isopropanol fuel cells are not currently available which serve many practical needs. For example, the applicants have appreciated that direct isopropanol fuel cells are not known which can operate under both ambient and sub-ambient temperature conditions and/or over extended periods of time.

Fluid dispensers and notably dispensers of hand cleaning fluids are known. The present applicants have appreciated that such dispensers suffer the disadvantage that a practical electrical power generating fuel cell is not currently available which can provide electrical power to a dispenser over long periods of time at ambient temperatures.

SUMMARY OF THE INVENTION

To at least partially overcome some of these disadvantages, the present invention provides a direct isopropanol fuel cell utilizing as fuel a mixture of isopropanol and water with isopropanol at relatively high concentration and preferably adapted for use in ambient conditions.

To at least partially overcome some of these disadvantages, the present invention also provides a dispenser of hand cleaning fluid comprising a mixture of isopropanol and water powered by a direct isopropanol fuel cell using as fuel the hand cleaning fluid.

In one preferred embodiment, the present invention provides a direct isopropanol fuel cell comprising: a proton conducting or exchange membrane with a cathode side and an anode side, a cathode having a cathode catalyst on the cathode side of the membrane and an anode catalyst on the anode side of the membrane such that the membrane is arranged between the cathode and the anode, a fuel supply unit configured to supply a liquid fuel to the anode, and an air supply unit configured to supply air to the cathode. The present invention also provides a method of use of such a direct isopropanol fuel cell by operating the direct fuel cell to generate electricity by supplying the anode with a liquid fuel and supplying the cathode with atmospheric air containing oxygen. The proton conducting or exchange membrane may comprise different commercially available membranes and preferably comprises a sulfonated poly(aryl ketone) membrane. The anode catalyst is preferably selected from the group of a platinum and ruthenium catalyst, a platinum and nickel catalyst, a platinum and gold catalyst, and mixtures thereof. The cathode catalyst preferably comprises a platinum catalyst, for example, platinum black. The liquid fuel preferably comprises isopropanol and water in contact with the anode catalyst on the anode side of the proton exchange membrane. The fuel cell may provide all electrical power to a fluid dispenser necessary to operate the dispenser. Preferably, the dispenser is a dispenser which automatically dispenses fluid and requires electrical power for controlled dispensing of a fluid. Preferably, the dispenser is a dispenser of a disinfecting and/or cleaning fluid, more preferably, a dispenser of hand cleaning fluid on to a person's hands. Preferably, the hand cleaning fluid is a mixture of isopropanol and water. Preferably, the same fluid dispensed onto a person's hands as a cleaner is used as fuel for the fuel cell.

In one aspect the present invention provides a direct isopropanol fuel cell comprising:
a proton conducting or exchange membrane with a cathode side and an anode side,
a cathode having a cathode catalyst on the cathode side of the membrane and a anode catalyst on the anode side of the membrane such that the membrane is arranged between the cathode and the anode,
a fuel supply unit configured to supply a liquid fuel to the anode,
an air supply unit configured to supply air to the cathode,
the anode catalyst is selected from the group of a platinum and ruthenium catalyst, a platinum and nickel catalyst, a platinum and gold catalyst, and mixtures thereof,
the cathode catalyst comprises a platinum catalyst,
the liquid fuel consisting of 10% to 90% by volume isopropanol, 90% to 10% by volume water and 0% to 30% by volume acetone in contact with the anode catalyst on the anode side of the membrane. Preferably, the membrane is a sulfonated poly(aryl ketone) membrane.

In another aspect the present invention provides a method of use of a direct isopropanol fuel cell, comprising:
providing a direct fuel cell comprising:
a proton conducting or exchange membrane with a cathode side and an anode side,
a cathode having a cathode catalyst on the cathode side of the membrane and a anode catalyst on the anode side of the membrane such that the membrane is arranged between the cathode and the anode,
operating the direct fuel cell to generate electricity by supplying the anode with a liquid fuel and supplying the cathode with atmospheric air containing oxygen;
the anode catalyst is selected from the group of a platinum and ruthenium catalyst, a platinum and nickel catalyst, a platinum and gold catalyst, and mixtures thereof,
the cathode catalyst comprises a platinum catalyst
the liquid fuel consisting of 10% to 90% by volume isopropanol, 90% to 10% by volume water and 0% to 30% by volume acetone in contact with the anode catalyst on the anode side of the membrane. Preferably, the fuel cell is operated at ambient temperatures. Preferably, the proton exchange membrane is a sulfonated poly(aryl ketone) membrane.

Fuel

Preferably, the fuel consists of merely isopropanol and water preferably without any impurities, however, small amounts of impurities and other compounds may be present provided the impurities and other compounds do not negatively affect the performance of the fuel cell. The fuel preferably consists of isopropanol and water. The fuel preferably consists of a fuel selected from the group consisting of: 10% to 90% by volume isopropanol and 90% to 10% by volume water; 40% to 90% by volume isopropanol and 60% to 10% by volume water; 60 to 80% by volume isopropanol and 40% to 20% by volume water; and 65% to 75% by volume isopropanol and 35% to 25% by volume water. One preferred fuel is 70% by volume isopropanol and 30% water by volume.

Preferably, the liquid fuel comprises 60 to 80% by volume isopropanol and 40% to 20% by volume water. Another preferred liquid fuel comprises 65% to 75% by volume isopropanol and 35% to 25% by volume water.

The fuel may include acetone as in a range of 0% to 30% by volume acetone. The acetone preferably does not exceed 30% by volume and, more preferably, does not exceed 5% by volume. The fuel preferably aside from acetone is free of any substantial impurities. The fuel may consist of a fuel selected from the group consisting of: 10% to 90% by volume isopropanol, 90% to 10% by volume water and 0 to 30% by volume acetone; 40% to 90% by volume isopropanol, 60% to 10% by volume water and 0 to 30% by volume acetone; 60% to 80% by volume isopropanol, 40% to 20% by volume water and 0 to 20% by volume acetone; and 65% to 75% by volume isopropanol, 35% to 25% by volume water, and 0 to 5% by volume acetone.

In accordance with some embodiments of the present invention, the fuel cell recycles the fuel from a fuel reservoir to an anode fuel chamber in which case the composition of the fuel may change with operation of the fuel cell and such recycling. The fuels referred to above are intended to represent the virgin fuel supplied to the reservoir prior to any recycling and, as indicated above, preferably has the compositions referred to above and, more preferably, consist of isopropanol and water.

In one embodiment of this invention, the fuel cell provides electrical power to operate a dispenser of hand cleaning fluid and these same preferred isopropanol and water mixtures are used both as the hand cleaning fluid to be dispensed onto a person's hands and as the fuel for the fuel cell.

In this application, all percentages of the components of the liquid fuel are percentages by volume considered at atmospheric pressure and a temperature of 20° C.

Isopropanol is appreciated by the applicant as being the smallest secondary alcohol.

The preferred fuel of mixtures of isopropanol with water are liquids at ambient temperatures and easy to store.

One advantageous use of isopropanol in relatively high concentrations in a water solution is that the solution is resistant to freezing under most ambient temperatures to which the fuel cell may be exposed including temperature below freezing such as temperatures as low as −40 degrees Celsius; −25 degrees Celsius; −20 degrees Celsius and −15 degrees Celsius. Suitable selection of the fuel and the relative proportions of isopropanol and water can assist in permitting use in low temperatures without freezing.

Proton Exchange Membrane

In a preferred fuel cell in accordance with the present invention, the proton conducting or exchange membrane (PEM) may comprise many different known membranes. The membrane preferably comprises sulfonated poly(aryl ketone) membrane, however, other commercially available membranes may be used. The sulfonated poly(aryl ketone) membrane comprises a sulfonated poly ether ketone membrane (SPEK); or a sulfonated poly ether ether ketone membrane (SPEEK).

The sulfonated poly(aryl ketone) membrane and particularly the SPEK is selected as it has been found to provide relatively low uptake of the fuel compared to perflorinated acid (PFA) type PEM such as that sold under the trade mark Nafion. The preferred sulfonated SPEK has a relatively small expansion when contacted with the fuel and preferably expands and contracts merely about 10%. This makes the sulfonated SPEK membrane easier to handle since it does not swell as much as other known PEM such as PFA type PEM. A saturated SPEK PEM has been found to have a relatively lower permeation rate than a saturated PFA type PEM.

A fuel cell assembly in accordance with the present invention needs to be operated in a manner which prevents the PEM from drying out during use or storage and thus must be kept moistened with the liquid fuel during use and storage.

Membrane Electrode Assembly

The fuel cell preferably incorporates a membrane electrode assembly (MEA) comprising a layered assembly of: (1) an anode gas diffusion layer (GDL), (2) an anode catalyst layer, (3) the proton conducting or exchange membrane, (4) a cathode catalyst layer, and (5) a cathode gas diffusion layer (GDL), in that order.

The membrane electrode assembly is preferably disposed between a cathode current collector on the cathode side of the membrane and an anode current collector on the anode side of the membrane.

In the PEM fuel cell, the redox half reactions are kept separate at the cathode and anode respectively. The MEA includes the proton exchange membrane that separates the two half reactions allowing protons to pass through the proton exchange membrane to complete the overall reaction. An electron created on the anode side is forced to flow through an external circuit thereby creating current. The MEA consists of the proton exchange membrane, the two disbursed catalyst layers and the two gas diffusion layers (GDL). Each GDL allows direct and uniform access of the fuel and oxidant to the respective catalyst layer so as to permit each respective half reaction. Thus, the anode GDL permits the fluid to access the catalyst layer between the anode GDL and the proton exchange membrane. The anode GDL allows the isopropanol fuel to reach the anode catalyst and thus for the reactive half reaction to occur. The cathode GDL permits oxygen from the air to pass through the cathode GDL to search the cathode catalyst intermediate the cathode GDL and the membrane. The cathode GDL thus allows access of the O2 oxidant to the cathode catalyst layer to provide the oxidation half reaction.

In a single PEM cell which is the preferred form of the present invention, a cathode current collector is provided outwardly of the GDL which assists in the carrying current away from the cell and permits the passage of the O2 oxidant from the air into the cell.

The cathode current collector is preferably in accordance with the present invention a conductive mesh or conductive wire screen with openings there through which permit ready passage of oxygen from the air through to the cathode GDL. Similarly, the anode current collector serves the function of carrying current away from the cell, permits distribution of the liquid fuel into the cell through the anode current collector to the anode GDL. The anode current collector preferably also comprises a conductive porous sheet or conductive wire mesh that permits the liquid fuel to pass through it to the anode GDL. Each of the anode GDL and the cathode GDL preferably allow the direct and uniform access of the liquid fuel and the O2 oxidant to their respective anode and cathode layers.

Target Reactions

The preferred fuel cell is preferably configured and operated such that at the anode catalyst, isopropanol is principally reduced to acetone plus two hydrogen ions in accordance with the following formula $$[CH_3CHOHCH3] > [CH_3COCH_3 + 2H^+ + 2e]$$

Thus, the fuel cell is preferably operated such that the principal reaction at the anode catalyst is to reduce a molecule of isopropanol into a molecule of acetone releasing two electrons. The various components of the fuel cell, the fuel and the operating conditions and the catalysts, notably the anode catalysts, are and have been preferably selected to principally result in this preferred reaction. Various operational parameters may be monitored and operation may be selected having regard to the monitored parameters to promote advantageous operation and notably operation enhancing and optimizing the preferred reaction. Operational parameters which can be monitored and/or controlled include the electrical potentials between the anode and the cathode, the power density and the current density.

The applicants have appreciated that the operation of the fuel cell at specific electrical potentials between the anode and the cathode increases the extent to which the isopropanol is principally reduced to acetone plus two hydrogen ions. In accordance with the present invention, the fuel cell is preferably operated at electrical potentials between the anode and cathode such that the principal reaction at the anode catalyst is to reduce a molecule of isopropanol into a molecule of acetone releasing two electrons. Preferably, the invention the fuel cell is preferably operated at electrical potentials between the anode and cathode above at least an electrical potential of 200 mV and, more preferably, not below 300 my and, more preferably, in a range of between about 400 mV and 500 mV.

Under some conditions of operation of a direct isopropanol fuel cell carbon dioxide may be produced by reactions at the anode catalyst. At the same time, carbon monoxide is produced as an intermediary. Production of carbon monoxide is disadvantageous. The applicants have appreciated that the operation of the fuel cell at lower electrical potentials between the anode and the cathode increases the carbon monoxide production. In accordance with the present invention, the fuel cell is preferably operated at electrical potentials between the anode and cathode sufficiently high that reactions with the fuel at the anode catalyst does not produce carbon dioxide. The fuel cell is preferably operated at electrical potentials between the anode and cathode not lower than 200 mV and, more preferably, not lower than 300 mV.

Various operational conditions in characteristics of the fuel cell in accordance with the present invention can be determined by monitoring the open circuit potential. The open circuit potential is defined as the electrical potential between the anode and the cathode under no load conditions. In accordance with the present invention sensors are provided to monitor the open circuit potential.

After operating the fuel cell for a period of time, the open circuit potential has been determined to reduce. It is believed that the reduction of the open circuit potential with time arises at least in part due to dehydration of the PEM and/or poisoning of the anode catalyst by carbon monoxide (CO) being produced on the catalyst and sitting on the catalyst. Control of the level of hydration of the PEM is preferably achieved by monitoring the open circuit potential and supplying fuel to the PEM. A preferred operation includes monitoring the open cell potential between the anode and the cathode to determine when the open cell potential falls below a preselected rest threshold. Preferably, operating the pump when the open cell potential is below a preselected rest threshold. Thus, in accordance with the invention, it is assumed that the open cell potential is at least in part representative of a low hydration level of the membrane, and the fuel cell is operated so as to maintain the hydration level of the membrane above a minimum threshold level.

In operation with the preferred reaction acetone is created at the anode catalyst by the oxidation of isopropanol. In accordance with the present invention, the fuel cell is configured and its various components selected to permit, and the fuel cell operates such that acetone created at the anode catalyst passes through the membrane to the cathode side of the proton conducting or exchange membrane into communication with the atmosphere and the acetone evaporates into the atmosphere. This is advantageous particularly in an arrangement in which fuel is recycled to the anode catalyst as one vehicle in limiting the levels of acetone that may develop in the fuel. Nevertheless, surprisingly in experimental tests, acetone levels in fuel have been found at levels as high as 30% by volume to cause no degradation of the performance of the fuel cell. At the anode catalyst, isopropanol is oxidized to acetone. In accordance with the present invention, the operation of the fuel cell has not be found to degrade as the percent of acetone in the fuel cell may increase Tests have shown that when the fuel contains 5% to 30% of acetone, surprisingly, there is not a significant degradation in the performance of the fuel cell. Acetone has a boiling point of approximately 6° C. whereas isopropanol has a boiling point of about 83° C. Selective evaporation of the acetone to the atmosphere from the cathode GDL as through an air chamber passively open to the atmosphere may be one mechanism which reduces the level of acetone in the fuel as may be recycled within a closed fuel system.

An advantage of the fuel cell in accordance with the present invention is that the liquid fuel of isopropanol and the reaction product of acetone do not significantly break down into carbon dioxide or other components.

Ambient Operating Conditions

Preferably, the fuel cell is operated under ambient conditions, that is, under ambient conditions of temperature and pressure. Ambient pressure is typically atmospheric pressure. Ambient temperatures may, for example, include relatively extreme temperature ranges as may be experienced in various outdoor and indoor environments such as, for example, without limitation temperatures in ranges of: from −40 degrees Celsius to +50 degrees Celsius, −25 degrees Celsius to −50 degrees Celsius, 0 degrees Celsius to +40 degrees Celsius and +5 degrees Celsius to +40 degrees Celsius. Ambient temperatures may, for example, include controlled environment indoor temperature ranges as may be experienced in various buildings and vehicles such as in ranges of: from +10 degrees Celsius to +30 degrees Celsius.

Operating the fuel cell under ambient conditions includes providing atmospheric air to the fuel cell at ambient temperature, and storing and supplying the liquid fuel at ambient temperatures.

The configuration of the fuel cell, its components and the mixtures of the isopropanol and water fuel may be selected having regard to the ambient conditions in which the fuel cell is to operate.

Catalyst Poisoning

During operation of the fuel cell the anode and/or the cathode which may have become poisoned by products of reactions at the respective anode and cathode. Periodically, while the fuel cell is not subject to an electrical load, a rejuvenation procedure may be performed. Monitoring the open circuit potential can provide an indication that the anode catalyst has been rejuvenated. The rejuvenation procedure may include permitting the fuel cell to be inactive that is to have no load applied to it. The rejuvenation procedure may include applying a reversed electrical potential between the anode and the cathode to rejuvenate the anode and/or the cathode by the removal of poisoning products of reactions at the respective anode and cathode.

For example, carbon monoxide may be created and become deposited on the anode catalyst. Such carbon monoxide can reduce the efficiency of the anode catalyst in promoting oxidation of the fuel this poisoning the catalyst over time. The fuel cell is preferably operated so as to maintain the level of carbon monoxide on the anode catalyst below a minimum threshold level. A low open cell potential is at least in part representative of a high level of carbon monoxide on the anode catalyst. Preferably, the fuel cell is operated to monitor the open cell potential between the anode and the cathode to determine when the carbon monoxide on the anode catalyst may exceed desired level as determined at least in part by a determination that the open cell potential falls below a preselected rest threshold. In a rejuvenation procedure, a reversed electrical potential may be applied between the anode and the cathode for a period of time to oxidize any carbon monoxide deposited on the anode catalyst.

Air Breathing/Passive Fuel Cell

In accordance with the present invention, preferably, the cathode is passively open to the atmosphere at least when the fuel cell is operated to generate electrical power. With the cathode open the atmosphere, the fuel cell is an air breathing fuel cell. At least on the cathode air side the fuel cell may be considered a passive fuel cell since the fuel cell is preferably operated without any prime mover to move the air to the fuel cell as is advantageous in reducing the energy consumption required to operate a positive or forced air delivery system. While not preferred, an active air supply system may be provided as to force atmospheric air to flow past the cathode, however, such an active air supply system is not preferred as it results in the consumption of electrical power to move the air.

Preferably, the fuel cell arrangement is provided with a mechanism to close the passive communication of atmospheric air with the cathode side of the MEA electrode. This can be advantageous as, for example, to reduce evaporation from the MEA as when the fuel cell is not in use to generate electrical power or in other operational modes as, for example, during catalyst regeneration. The fuel cell has the air supply unit configured to supply air to the cathode. The air supply unit preferably includes an air chamber disposed adjacent to the cathode and having air openings from the air chamber to the cathode with the air chamber open to the atmosphere air. The air supply unit may further include a closure member movable between an open position permitting the atmospheric air and the cathode side of the proton electrode membrane to be passively in communication and a closed position sealing the cathode side of the PEM from communication with the atmospheric air. The air supply unit may include a mechanism to move the closure member between the open position and the closed position. The fuel cell may be operated maintaining the closure member in the open position during operation of the fuel cell to generate electrical power, and maintaining the closure member in the closed position while the fuel cell is not subject to an electrical load. For example, operation may include periodically maintaining the closure member in the closed position while the fuel cell is not subject to an electrical load to regenerate the cathode catalyst and/or anode catalyst.

Fuel Supply Unit

The fuel cell includes a fuel supply unit configured to supply a liquid fuel to the anode. The fuel supply unit preferably includes an enclosed anode fuel chamber open to the anode on the anode side of the membrane. The anode fuel chamber may have an inlet preferably at an upper end and an outlet, preferably at a lower end. The fuel supply unit may include an enclosed fuel reservoir spaced from the anode fuel chamber with a return passageway connecting the outlet of the fuel chamber with the fuel reservoir, and a delivery passageway connecting the inlet of the anode fuel chamber. Preferably, a fuel pump is provided to draw fuel from the reservoir and discharge the fuel into the anode fuel chamber via the inlet. Preferably, the fuel is recycled between the reservoir and the anode fuel chamber. The fuel reservoir may be located at a height below the anode fuel chamber. The fuel may drain under gravity from the anode fuel chamber to the reservoir.

The fuel supply unit further includes a fuel supply container containing fuel separate from the reservoir for supply of fuel to the reservoir. The supply container is preferably located at a height above the fuel reservoir and includes a supply passageway to supply fuel from the supply container to the fuel reservoir under gravity. A one way fuel level maintaining valve may be disposed across the supply passageway to permit flow of fuel from the supply container to the fuel reservoir under gravity only when a level of fluid in the fuel reservoir is below a predetermined level.

The fuel pump is provided to provide the fuel to an anode fuel chamber in contact with the anode side of the membrane electrode assembly. However, towards conserving the energy required to operate the fuel cell, the fuel pump is preferably driven only intermittently having regard to various factors including notably but without limitation dehydration of the membrane electrode assembly, and evaporative loss from the cathode air side of the membrane electrode assembly.

Various methods may be provided for operation of the fuel cell. One preferred method includes during operation of the fuel cell to generate electrical power, operating the fuel cell in a cycle of operation including a first step of operating the fuel pump for a first period of time to fill the fuel chamber with fuel, and a second step of not operating the pump for a second period of time. In a fuel cell which has the closure member for controlling air communication the operation may include, while maintaining the closure member in the closed position while the fuel cell is not subject to an electrical load, operating the fuel cell in a cycle of operation including a first step of operating the fuel pump for a first period of time to fill the fuel chamber with fuel, and a second step of not operating the pump for a second period of time, and wherein during the second step of not operating the pump, monitoring the open cell potential between the anode and the cathode and recommencing the cycle with the first step of operating the pump when the open cell potential falls below a preselected rest threshold representative of a low hydration level of the membrane so as to maintain the hydration level of the membrane above a minimum threshold level.

As another method of operation, the anode fuel chamber is maintained filled with the liquid fuel or a vapor of the liquid fuel and reactant products of the reaction of the fuel at the anode so as to prevent atmospheric air passing through the fuel chamber to the anode side of the proton electrode membrane.

End Plate Construction

A preferred fuel cell of this invention includes an anode end plate and a cathode end plate. The end plates may be constructed of a non-conductive material such as preferably a polymer. Each end plate may be injection molded and/or machined from a unitary element to reduce the number of components.

The anode end plate has an inward anode face and an outward anode face. The cathode end plate has an inward cathode face and an outward cathode face. The anode end plate and the cathode end plate are drawn together with inward anode face in sealed engagement with the cathode end plate sandwiching the membrane electrode assembly between the cathode current collector on the cathode side of the membrane electrode assembly and the anode current collector on the anode side of the membrane electrode assembly. Preferably, the fuel supply unit includes an enclosed anode fuel chamber open to the anode on the anode side of the membrane electrode assembly, and the fuel chamber is defined between the cathode end plate and the anode end plate within an anode fuel cavity open to the anode inward face towards the cathode end plate. Preferably, the air supply unit includes an air chamber disposed adjacent to the cathode and having air openings from the air chamber to the cathode, the air chamber open to the atmosphere air. Preferably, the air chamber is defined within the cathode end plate as an air cavity open outwardly to the cathode outer face and with the air openings extending inwardly from the air chamber to the cathode inward face, preferably with the air openings being open through the cathode inward face to the cathode current collector of the cathode on the cathode side of the membrane. Preferably, the air supply unit further includes a closure member coupled to the fuel cell for movement between an open position permitting the atmospheric air to be passively in communication with the air chamber and a closed position preventing the air chamber from communication with the atmospheric air. A closure mechanism is mounted to the fuel cell to move the closure member between the open position and the closed position. The closure member may comprise a plate pivotably mounted the cathode plate for pivotal motion movement between the open position in which the plate is spaced from the outer cathode face and the closed position in which the plate is proximate the outer cathode face. The closure mechanism may comprise an electric motor and a linkage mechanism wherein a relative rotational position of an output shaft of the motor determines the relative location of the closure member between the open and the closed position.

The present invention provides various concepts including:

As concept 1, a method of use of a direct isopropanol fuel cell, comprising:
providing a direct fuel cell comprising:
a proton conducting or exchange membrane with a cathode side and an anode side,
a cathode having a cathode catalyst on the cathode side of the membrane and a anode catalyst on the anode side of the membrane such that the membrane is arranged between the cathode and the anode,
operating the direct fuel cell to generate electricity by supplying the anode with a liquid fuel and supplying the cathode with atmospheric air containing oxygen;
wherein the membrane comprising a sulfonated poly(aryl ketone) membrane,
the anode catalyst is selected from the group of a platinum and ruthenium catalyst, a platinum and nickel catalyst, a platinum and gold catalyst, and mixtures thereof,
the cathode catalyst comprises a platinum catalyst,
the liquid fuel consisting of 10% to 90% by volume isopropanol, 90% to 10% by volume water and 0% to 30% by volume acetone in contact with the anode catalyst on the anode side of the membrane.

As concept 2, a method as in concept 1 including operating the fuel cell at ambient temperatures.

As concept 3, a method as in concept 2 including providing atmospheric air at ambient temperature, and storing and supplying the liquid fuel at ambient temperatures.

As concept 4, a method as in concepts 1 to 3 wherein the anode catalyst consists of the platinum and ruthenium catalyst.

As concept 5, a method as in concepts 1 to 4 wherein the membrane comprises a sulfonated poly(aryl ketone) membrane.

As concept 6, a method as in concepts 1 to 4 wherein the membrane comprises a sulfonated poly(aryl ketone) membrane selected from the group consisting of: (a) a sulfonated poly ether ketone membrane (SPEK); and (b) a sulfonated poly ether ether ketone membrane (SPEEK).

As concept 7, a method as in concepts 1 to 6 wherein the cathode catalyst is a platinum black catalyst.

As concept 8, a method as in concepts 1 to 7 wherein during operation of the fuel cell to generate electrical power, the atmospheric air and the cathode side of the membrane are passively in communication.

As concept 9, a method as in concept 8 including:
providing a closure member movable between an open position permitting the atmospheric air and the cathode side of the membrane to be passively in communication and a closed position sealing the cathode side of the membrane from communication with the atmospheric air, and
maintaining the closure member in the open position during operation of the fuel cell to generate electrical power, and maintaining the closure member in the closed position while the fuel cell is not subject to an electrical load.

As concept 10, a method as in concept 9 including periodically maintaining the closure member in the closed position while the fuel cell is not subject to an electrical load to regenerate the cathode catalyst and/or the anode catalyst.

As concept 11, a method as in concepts 1 to 10 wherein the fuel cell comprises a membrane electrode assembly,
the membrane electrode assembly comprising a layered assembly of an anode gas diffusion layer, an anode catalyst layer, the membrane, a cathode catalyst layer, and a cathode gas diffusion layer in that order.

As concept 12, a method as in concept 11 wherein the membrane electrode assembly is between a cathode current collector on the cathode side of the membrane and an anode current collector on the anode side of the membrane.

As concept 13, a method as in concepts 1 to 11 including operating the fuel cell such that the principal reaction at the anode catalyst is to oxidize a molecule of isopropanol into a molecule of acetone releasing two electrons.

As concept 14, a method as in concepts 1 to 12 including operating the fuel cell at electrical potentials between the anode and cathode sufficiently high that the principal reaction at the anode catalyst is to oxidize a molecule of isopropanol into a molecule of acetone releasing two electrons.

As concept 15, a method as in concepts 1 to 13 wherein the fuel cell is operated at electrical potentials between the anode and cathode sufficiently high that reactions with the fuel at the anode catalyst does not produce carbon dioxide.

As concept 16, a method as in concepts 1 to 13 wherein the fuel cell is operated at electrical potentials between the anode and cathode greater than 200 mV.

As concept 17, a method as in concepts 1 to 13 wherein the fuel cell is operated at electrical potentials between the anode and cathode greater than 300 mV.

As concept 18, a method as in concepts 1 to 13 wherein the fuel cell is operated at electrical potentials between the anode and cathode in the range of 300 mV to 400 mV.

As concept 19, a method as in concepts 1 to 18 including operating the fuel cell to create acetone at the anode catalyst by the oxidation of isopropanol, providing for the acetone to pass through the membrane to cathode side of the membrane into communication with the atmospheric and evaporating the acetone into the atmosphere.

As concept 20, a method as in concepts 1 to 18 providing the fuel cell with an enclosed anode fuel chamber open to the anode side of the membrane and having an inlet at an upper end and a drain outlet at a lower end, an enclosed fuel reservoir located at a height below the anode fuel chamber, a drain passageway connecting the drain outlet of the fuel chamber with the fuel reservoir, and a fuel pump to draw fuel from the fuel reservoir and discharge the fuel into the anode fuel chamber via the inlet, operating the pump periodically to discharge the fuel into the anode fuel chamber.

As concept 21, a method as in concept 19 including permitting fuel in the anode fuel chamber to flow from the anode fuel chamber to the fuel reservoir via the drain passageway.

As concept 22, a method as in concept 19 or 20 including monitoring the open cell potential between the anode and the cathode to determine when the open cell potential falls below a preselected rest threshold.

As concept 23, a method as in concept 21 including operating of the pump when the open cell potential is below a preselected rest threshold.

As concept 24, a method as in concepts 21 to 22 wherein the open cell potential is at least in part representative of a low hydration level of the membrane, and operating the fuel cell so as to maintain the hydration level of the membrane above a minimum threshold level.

As concept 25, a method as in concepts 21 to 23 wherein during operation of the fuel cell to generate electrical power, carbon monoxide is created at the anode catalyst and becomes deposited on the anode catalyst reducing the efficiency of the anode catalyst in promoting the reduction of the fuel, the open cell potential is at least in part representative of a high level of carbon monoxide on the anode catalyst, and operating the fuel cell so as to maintain the level of carbon monoxide on the anode catalyst below a minimum threshold level.

As concept 26, a method as in concepts 19 to 24 including during operation of the fuel cell to generate electrical power, operating the fuel cell in a cycle of operation including a first step of operating the pump for a first period of time to fill the anode fuel chamber with fuel and a second step of not operating the pump for a second period of time.

As concept 27, a method as in concepts 19 to 25 wherein while maintaining the closure member in the closed position while the fuel cell is not subject to an electrical load including:

operating the fuel cell in a cycle of operation including a first step of operating the pump for a first period of time to fill the anode fuel chamber with fuel, and a second step of not operating the pump for a second period of time, and wherein during the second step of not operating the pump monitoring the open cell potential between the anode and the cathode and recommencing the cycle with the first step of operating the pump when the open cell potential falls below a preselected rest threshold representative of a low hydration level of the membrane so as to maintain the hydration level of the membrane above a minimum threshold level.

As concept 28, a method as in concepts 19 to 26 including maintaining the anode fuel chamber filled with the liquid fuel or a vapor of the liquid fuel and reactant products of the reaction of the fuel at the anode so as to prevent atmospheric air passing through the fuel chamber to the anode side of the membrane.

As concept 29, a method as in concept 26 wherein while maintaining the closure member in the closed position while the fuel cell is not subject to an electrical load including applying a revered electrical potential between the anode and the cathode to rejuvenate the anode and/or the cathode which may have become poisoned by products of reactions at the respective anode and cathode.

As concept 30, a method as in concept 26 wherein while maintaining the closure member in the closed position while the fuel cell is not subject to an electrical load, applying a reversed electrical potential between the anode and the cathode for a period of time to oxidize any carbon monoxide deposited on the anode catalyst as a product of a reaction at the anode catalyst.

As concept 31, a method as in any one of concepts 1 to 29 including operating the fuel cell at ambient temperatures in the range of minus 25 degrees Celsius to plus 50 degrees Celsius.

As concept 32, a method as in any one of concepts 1 to 29 including operating the fuel cell at ambient temperatures in the range of 0 degrees Celsius to plus 50 degrees Celsius.

As concept 33, a method as in any one of concepts 1 to 29 including operating the fuel cell at ambient temperatures in the range of minus 15 degrees Celsius to plus 50 degrees Celsius.

As concept 34, a method as in any one of concepts 1 to 29 including operating the fuel cell at ambient temperatures in the range of plus 5 degrees Celsius to plus 40 degrees Celsius.

As concept 35, a direct isopropanol fuel cell comprising:
a proton conducting or exchange membrane with a cathode side and an anode side,
a cathode having a cathode catalyst on the cathode side of the membrane and a anode catalyst on the anode side of the membrane such that the membrane is arranged between the cathode and the anode,
a fuel supply unit configured to supply a liquid fuel to the anode,
an air supply unit configured to supply air to the cathode,
the anode catalyst is selected from the group of a platinum and ruthenium catalyst, a platinum and nickel catalyst, a platinum and gold catalyst, and mixtures thereof,
the cathode catalyst comprises a platinum catalyst, the liquid fuel consisting of 10% to 90% by volume isopropanol, 90% to 10% by volume water and 0% to 30% by volume acetone in contact with the anode catalyst on the anode side of the membrane.

As concept 36, a fuel cell as in concept 34 wherein the anode catalyst consists of the platinum and ruthenium catalyst.

As concept 37, a fuel cell as in concepts 34 to 35 wherein the membrane comprises a sulfonated poly(aryl ketone) membrane.

As concept 38, a fuel cell as in concepts 34 to 36 wherein the membrane comprises a sulfonated poly(aryl ketone) membrane selected from the group consisting of: (a) a sulfonated poly ether ether ketone membrane (SPEEK); and (b) a sulfonated poly ether ketone membrane (SPEK).

As concept 39, a fuel cell as in concepts 34 to 37 wherein the cathode catalyst is a platinum black catalyst.

As concept 40, a fuel cell as in concepts 34 to 37 wherein the fuel supply unit includes an enclosed anode fuel chamber open to the anode on the anode side of the membrane.

As concept 41, a fuel cell as in concept 39 wherein: the anode fuel chamber having an inlet at an upper end and a drain outlet at a lower end, the fuel supply unit further includes an enclosed fuel reservoir spaced from the anode fuel chamber, a drain passageway connecting the drain outlet of the fuel chamber with the fuel reservoir, and a fuel pump to draw fuel from the fuel reservoir and discharge the fuel into the anode fuel chamber via the inlet.

As concept 42, a fuel cell as in concept 40 wherein the fuel reservoir is located at a height below anode fuel chamber.

As concept 43, a fuel cell as in concept 40 wherein the fuel supply unit further including a fuel supply container containing fuel, the supply container is located at a height above the fuel reservoir, a supply passageway to supply fuel from the supply container to the fuel reservoir under gravity, a one-way fuel level maintaining valve disposed across the supply passageway to permit flow of fuel from the supply container to the fuel reservoir under gravity only when a level of fluid in the fuel reservoir is below a predetermined level.

As concept 44, a fuel cell as in concepts 34 to 42 wherein the air supply unit includes an air chamber disposed adjacent to the cathode and having air openings from the air chamber to the cathode, the air chamber open to the atmosphere air.

As concept 45, a fuel cell as in concept 43 wherein the air supply unit further includes a closure member movable between an open position permitting the atmospheric air and the cathode side of the membrane to be passively in communication and a closed position sealing the cathode side of the membrane from communication with the atmospheric air.

As concept 46, a fuel cell as in concept 44 wherein the air supply unit further comprising a mechanism to move the closure member between the open position and the closed position, the fuel cell comprises a membrane electrode assembly.

As concept 47, a fuel cell as in concepts 34 to 45 wherein the membrane electrode assembly comprises a layered assembly of an anode catalyst layer, an anode gas diffusion layer, the membrane, a cathode gas diffusion layer and a cathode catalyst layer in that order.

As concept 48, a fuel cell as in concept 46 wherein the membrane electrode assembly is between a cathode current collector of the cathode on the cathode side of the membrane and an anode current collector of the anode on the anode side of the membrane.

As concept 49, a fuel cell as in concept 47 including an anode end plate and a cathode end plate, the anode end plate having an inward anode face and an outward anode face, the cathode end plate having an inward cathode face and an outward cathode face, the anode end plate and the cathode end plate are drawn together with inward anode face in sealed engagement with the cathode end plate sandwiching the anode and the cathode therebetween with the membrane electrode assembly between the cathode current collector of the cathode on the cathode side of the membrane and the anode current collector of the anode on the anode side of the membrane.

As concept 50, a fuel cell as in concept 48 wherein: the fuel supply unit includes an enclosed anode fuel chamber open to the anode on the anode side of the membrane, the fuel chamber defined between the cathode end plate and the anode end plate within an anode fuel cavity open to the anode inward face towards the cathode end plate.

As concept 51, a fuel cell as in concept 49 wherein the air supply unit includes an air chamber disposed adjacent to the cathode and having air openings from the air chamber to the cathode, the air chamber open to the atmosphere air, the air chamber defined within the cathode end plate as an air cavity open outwardly to the cathode outer face and with the air openings extending inwardly from the air chamber to the cathode inner face, the air openings open through the cathode inner face to the cathode current collector of the cathode on the cathode side of the membrane.

As concept 52, a fuel cell as in concept 43 wherein the air supply unit further includes a closure member coupled to the fuel cell for movement between an open position permitting the atmospheric air to be passively in communication with the air chamber and a closed position preventing the air chamber from communication with the atmospheric air.

As concept 53, a fuel cell as in concept 51 wherein the air supply unit further comprising a closure mechanism mounted to the fuel cell to move the closure member between the open position and the closed position.

As concept 54, a fuel cell as in concept 51 wherein the closure member comprises a plate is pivotably mounted the cathode plate for pivotal motion movement between the open position in which the plate is spaced from the outer anode face and the closed position in which the plate is proximate the outer anode face, the closure mechanism comprising an electric motor and a linkage mechanism wherein a relative rotational position of an output shaft of the motor determines the relative location of the closure member between the open and the closed position.

As concept 55, a fuel cell as in concept 49 wherein the anode fuel chamber having an inlet at an upper end and a drain outlet at a lower end, the fuel supply unit further includes an enclosed fuel reservoir spaced from the anode fuel chamber, a drain passageway connecting the drain outlet of the fuel chamber with the feel reservoir, and a fuel pump to draw fuel from the reservoir and discharge the fuel into the anode fuel chamber via the inlet.

As concept 56, a fuel cell as in concept 54 wherein the fuel reservoir is located at a height below anode fuel chamber.

As concept 57, the method of concepts 1 to 34 wherein the fuel consist of a fuel selected from the group consisting of:
40% to 90% by volume isopropanol and 60% to 10% by volume water;
60% to 80% by volume isopropanol and 40% to 20% by volume water; and
65% to 75% by volume isopropanol and 35% to 25% by volume water.

As concept 58, the method of concepts 1 to 34 wherein the fuel consist of a fuel selected from the group consisting of:
40% to 90% by volume isopropanol, 60% to 10% by volume water and 0 to 30% by volume acetone;
60% to 80% by volume isopropanol, 40% to 20% by volume water and 0 to 20% by volume acetone; and
65% to 75% by volume isopropanol, 35% to 25% by volume water, and 0 to 5% by volume acetone.

As concept 59, the method of concepts 1 to 34 including:
providing the fuel cell with an anode fuel chamber open to the anode side of the membrane and a fuel reservoir,
transferring the fuel from the reservoir to the anode fuel chamber and returning the fuel from the anode fuel chamber to the reservoir,
including supplying the fuel to the reservoir,
wherein the fuel supplied to the reservoir consisting of a fuel selected from the group consisting of:
40% to 90% by volume isopropanol and 60% to 10% by volume water;
60% to 80% by volume isopropanol and 40% to 20% by volume water; and
65% to 75% by volume isopropanol and 35% to 25% by volume water.

As concept 60, a fuel cell as in any one of concepts 35 to 59 in combination with a dispenser of hand cleaning fluid which requires electrical power to dispense a cleaning fluid onto a hand of a person using the dispenser, and wherein the fuel cell supplies all electrical power required for operation of the dispenser.

As concept 61, a fuel cell as in concept 60 wherein the dispenser dispensing as a hand cleaner the same fluid used as the fuel for the fuel cell.

As concept 62, a fuel cell as in concept 60 or 61 wherein the dispenser dispenses fluid with an electrically powered dispensing pump when an electrically powered sensing system senses the presence of a user's hand.

BRIEF DESCRIPTION OF THE DRAWINGS

Further aspects and advantages of the present invention will appear from the following description taken together with the accompanying drawings in which.

DETAILED DESCRIPTION OF THE DRAWINGS

Figure 1:
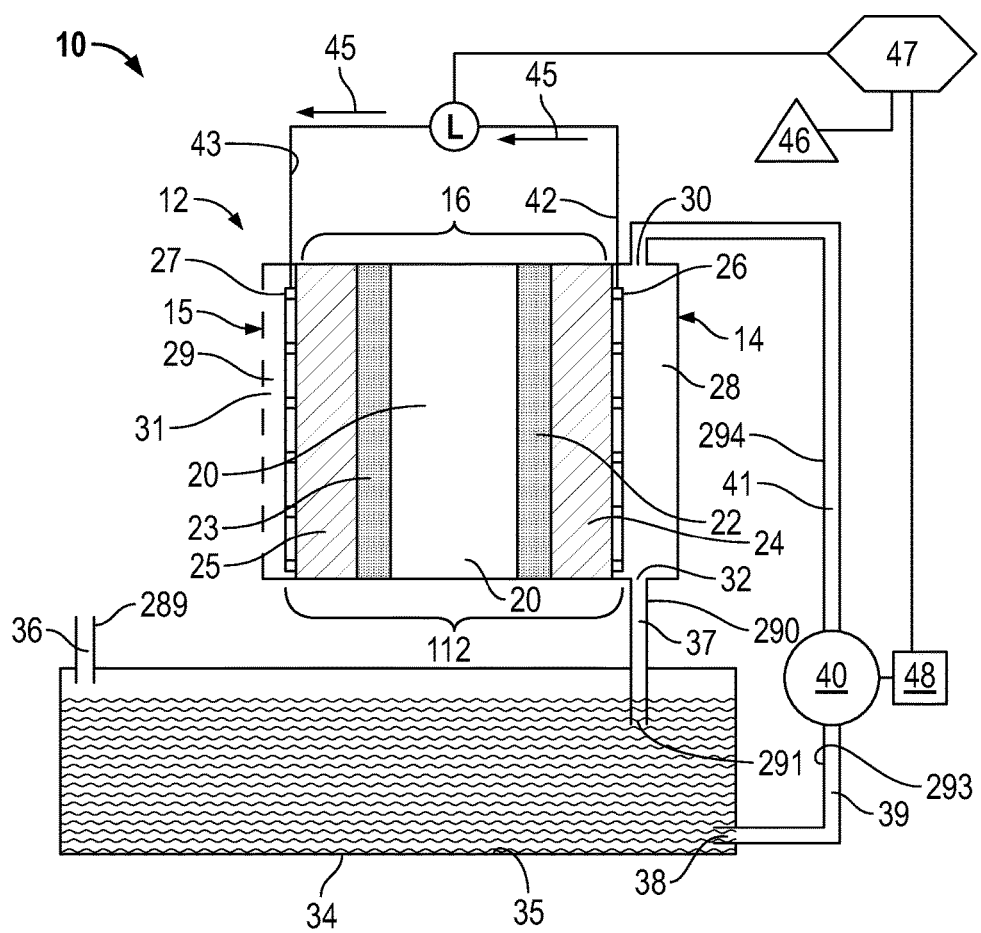
FIG. 1 is a schematic view of a fuel cell arrangement in accordance with a first embodiment of the present invention.

Reference is made to FIG. 1 which is a schematic view of a fuel cell arrangement 10 in accordance with a first embodiment of the present invention. The fuel cell arrangement 10 notably includes a power generator 12 which provides a number of elements sandwiched together between on the right hand side, an anode end plate 14, and on the left hand side, a cathode end plate 15. A membrane electrode assembly (MEA) 16 is provided in the center with an anode current collector 26 between the MEA 16 and the anode end plate 14 and a cathode current collector 27 between the cathode end plate 15 and the MEA 16.

The MEA 16 comprises five layers of which the center layer is a proton exchange membrane 20. On the right side of the proton conducting or exchange membrane 20 an anode catalyst 22 is provided. To the right of the anode catalyst 22, an anode gas diffusion layer (GDL) 24 is provided beside the anode current collector 26. On the left hand side of the proton electrode membrane 20, a cathode catalyst 23 is provided. To the left of the cathode catalyst 23 a cathode gas diffusion layer (GDL) 25 is provided beside the cathode current collector 27.

To the left laterally outwardly of the cathode current collector 27, an air chamber 29 is defined within the cathode end plate 15. The air chamber 29 is open outwardly to the atmosphere via air openings 31 through the cathode end plate 15. On the right hand side the anode end plate 14 defines therein an anode fuel chamber 28 opening inwardly through the anode current collector 26 to the anode GDL 24. The anode fuel chamber 28 closed otherwise other than at a fuel chamber inlet 30 at an upper end of the anode fuel chamber 28 and a fuel chamber outlet 32 at a lower end of the anode fuel chamber 28.

A fuel reservoir 34 is provided at a height below the anode fuel chamber 28. The fuel reservoir 34 is shown as an enclosed vessel with an enclosing wall 35. An air vent tube 289 provides an air vent passageway 36 through the wall 35 to the atmosphere so as to provide for equalization of the pressure inside the fuel reservoir 34 with the atmospheric air as, for example, to relieve any vacuum which may be developed within the fuel reservoir 34 as fuel is consumed by the fuel cell. A fuel chamber drain tube 290 provides a drain passageway 37 from fuel chamber outlet 32 to a drain tube outlet 291 in the fuel reservoir 34 to permit fluid within the anode fuel chamber 28 to flow, as under gravity, from the anode fuel chamber 28 into the fuel reservoir 34. A reservoir outlet 38 is provided connected via a fuel pump feed tube 293 providing a feed passageway 39 to a fuel pump 40. The fuel pump 40 is connected via a fuel pump discharge tube 294 providing a discharge passageway 41 to the fuel chamber inlet 30. The fuel pump 40 when operating draws fluid from the reservoir 34 via the feed passageway 39 and discharges it via the discharge passageway 44 into the anode fuel chamber 28.

The anode current collector 26 comprises a conductive wire mesh or screen. An anode lead wire 42 is electrically connected to the anode collector 26 and extends upwardly therefrom. The cathode current collector 27 comprises a conductive wire mesh or screen. A cathode lead wire 43 is electronically connected to the cathode current collector 27.

The anode lead wire 42 and the cathode lead wire 43 are schematically illustrated as connected so as to have an electronic load L therebetween as with electrons moving in the wires 42 and 43 in a direction indicated by the arrows 45 when the fuel cell arrangement is operational to create electrical energy. The load L is schematically illustrated as being electrically interconnected via a controller 47 to an electrical power storage device 46. The controller 47 is also electrically interconnected with an electric motor 48 to drive the fuel pump 40. In operation of the fuel cell arrangement 10 electrical power is generated by the cell 12 as schematically illustrated by the load L which power is under the control of the controller 47 directed as to be stored in electrical power storage device 46 and/or the delivered to the pump motor 48 to drive the fuel pump 40. The controller 47 preferably includes various sensing devices and capability to sense various aspects the operation of the fuel cell arrangement 10 the load L and the open circuit potential preferably over time. The electrical power storage device 46 may comprise rechargeable batteries, capacitors and the like.

Figure 2:
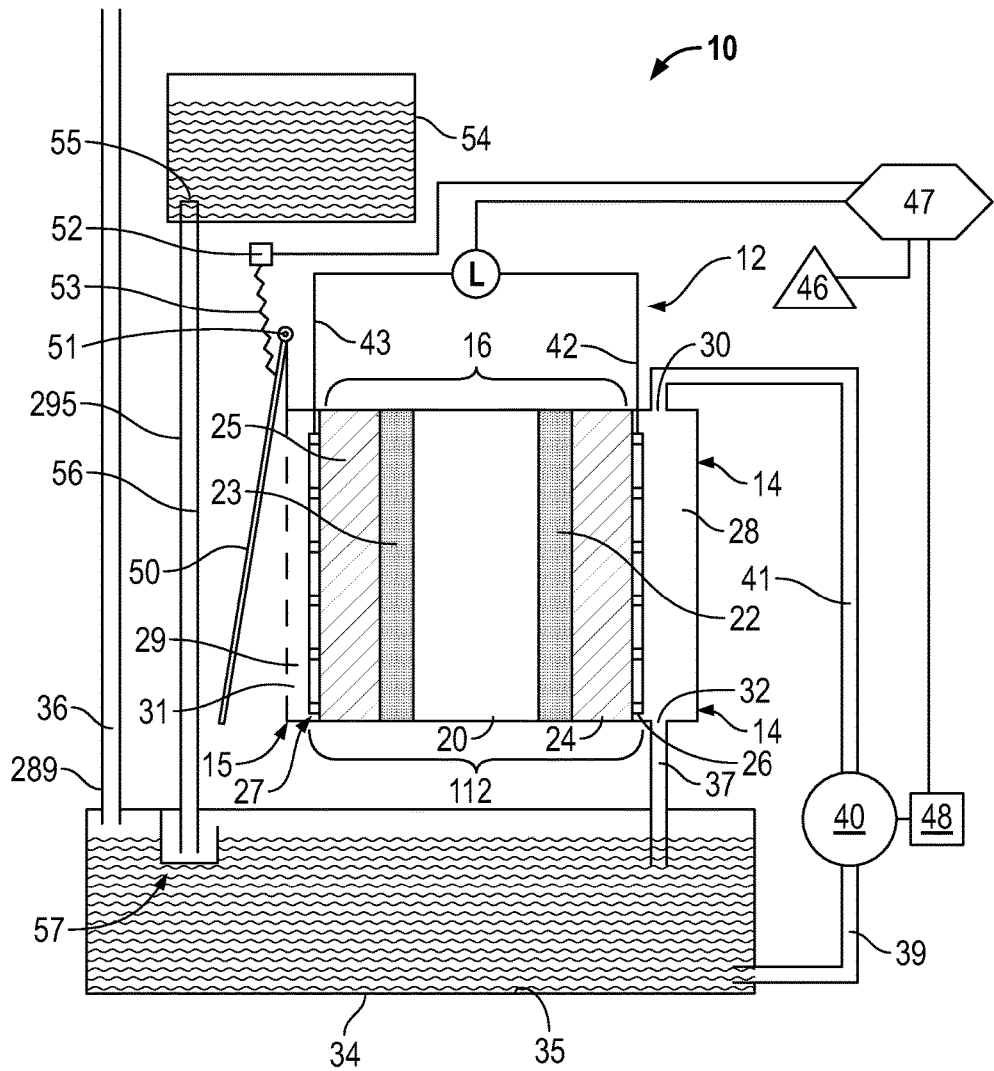
FIG. 2 is a schematic view of a fuel cell arrangement in accordance with a second embodiment of the present invention.

Reference is made to FIG. 2 which shows a fuel cell arrangement 10 in accordance with a second embodiment of the present invention. The fuel cell arrangement 10 of FIG. 2 is identical to the fuel cell arrangement of FIG. 1, however, with the following additions.

As a first addition, an air closure cover 50 is provided mounted for pivoting about a pivot axis 51 from an open position as shown in FIG. 2 which permits a free flow of atmospheric air through the air openings 31 into the air chamber 29 and a closed position, not shown in FIG. 2, in which the air closure cover 50 pivots about the pivot axis 51 counter clockwise to engage the cathode end plate 15 and close the air openings 31 preventing communication between the atmospheric air and the air chamber 29. A cover movement mechanism is provided to move the air closure cover 50 between the open position and closed position including a cover motor 52 coupled to the controller 47, and a linkage assembly 53 connected between the cover motor 52 and the air closure cover 50 to move the air closure cover 50 between the open and closed positions as controlled by the controller 47 selectively operating the motor 52.

As a second addition, a fuel supply container 54 is provided which may, for example, comprise a bottle. The container 54 has a container outlet 55. The container 54 supplies the liquid fuel to the fuel reservoir 34 to maintain the fuel reservoir 34 substantially full of fuel. In FIG. 2, the fuel supply container 54 is disposed at height above the fuel reservoir 34 and a gravity feed arrangement provides for the liquid fuel to flow under gravity from the fuel supply container 54 to the fuel reservoir 34. In this regard, a supply tube 295 provides a supply passageway 56 that connects the container outlet 55 to a fuel level controlling inlet valve 57 that opens into the fuel reservoir 34. The fuel level controlling inlet valve 57 permits the liquid fuel to flow from the fuel supply container 54 into the fuel reservoir 34 only when the level of the fuel within the reservoir 34 is below a certain level. The fuel level controlling inlet valve 57 may preferably is of a simple construction with a minimum of moving parts such as a preferred chicken feeder type valve arrangement.

In FIG. 2, the air vent tube 289 is shown as preferably extending upwardly to provide the upper end of the air vent passageway 36 at a height above the height of the fuel within the fuel supply container 54. In a situation that the fuel level controlling inlet valve 57 may malfunction, providing the upper end of the air vent passageway 36 above the fuel supply container 54 will prevent fuel from flowing under gravity out the upper end of the air vent passageway 36.

Reference is made to FIGS. 3 to 17 which illustrate a preferred configuration of selected elements of the fuel cell arrangement 10 shown schematically in FIG. 2.

Figure 3:
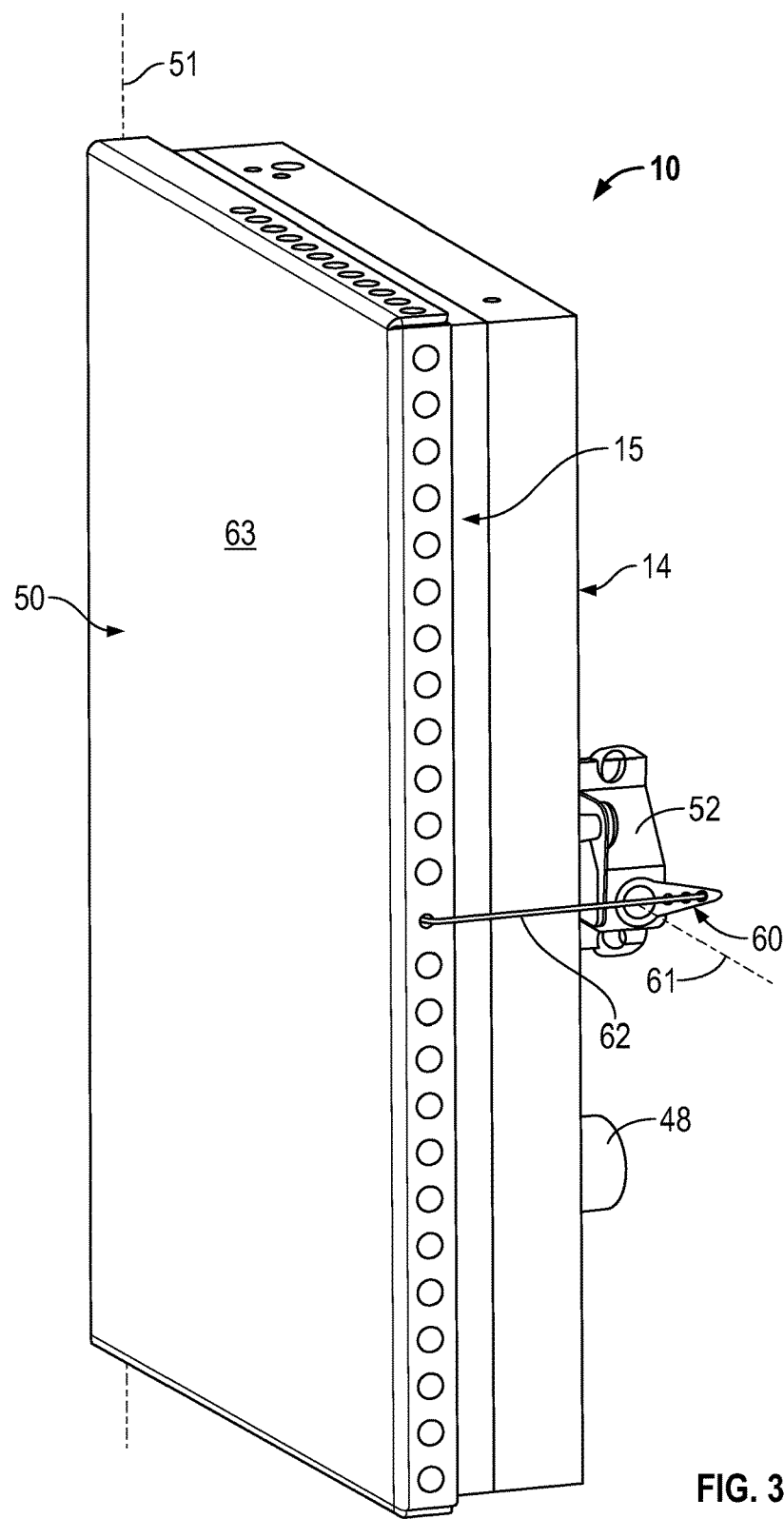
FIG. 3 is a pictorial front and top view of a fuel cell assembly in accordance with the second embodiment with an air closure cover in a closed position.
Figure 4:
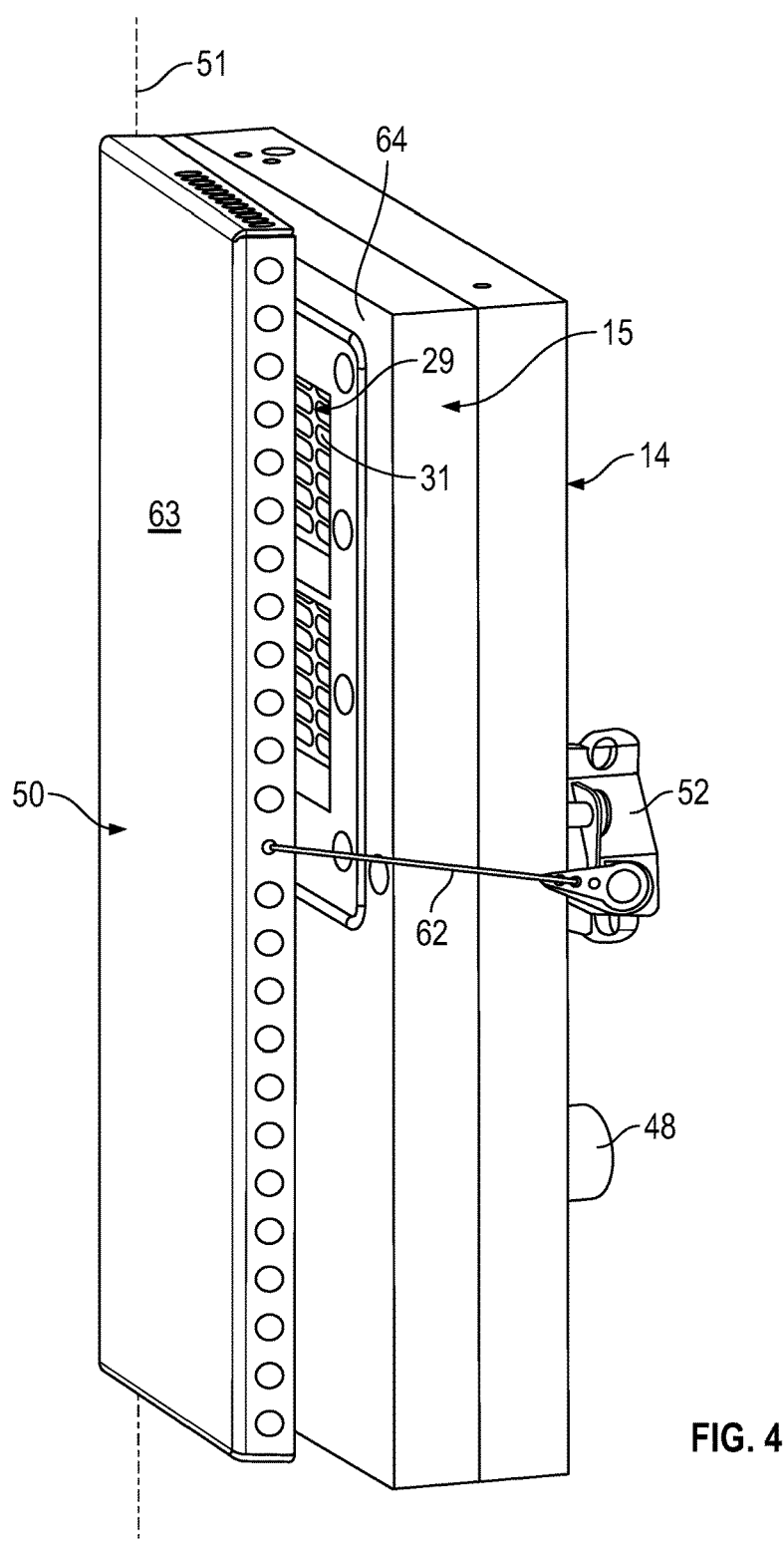
FIG. 4 is a pictorial view of the fuel cell assembly of FIG. 3 with the air closure cover in an open position.

In FIG. 3, the air closure cover 50 is pivotally mounted to the cathode end plate 15 for pivoting about the pivot axis 51 disposed vertically in FIG. 3. The air closure cover 50 is movable between a closed position as shown in FIG. 3 and an open position as seen in FIG. 4. The cover motor 52 is shown as being mounted to the anode end plate 14. The linkage assembly 53 includes a pivot arm 60 which is rotated by the cover motor 52 about a horizontal axis 61 between a closed position shown in FIG. 3 and an open position shown in FIG. 4. A link arm 62 is pivotally connected at one end to the air closure cover 50 radially spaced from the axis 51 and at the other end to a distal end of the pivot arm 61 such that the relative rotational position of the pivot arm 61 about the axis 61 will determine the extent to which the air closure cover 50 will be located between the fully closed and the fully opened position.

The air closure cover 50 has a face plate 63 which in the closed position is disposed to closely overly and engage an outer face 64 of the cathode end plate 15 to prevent air communication between the atmosphere and the air chamber 29.

Figure 5:
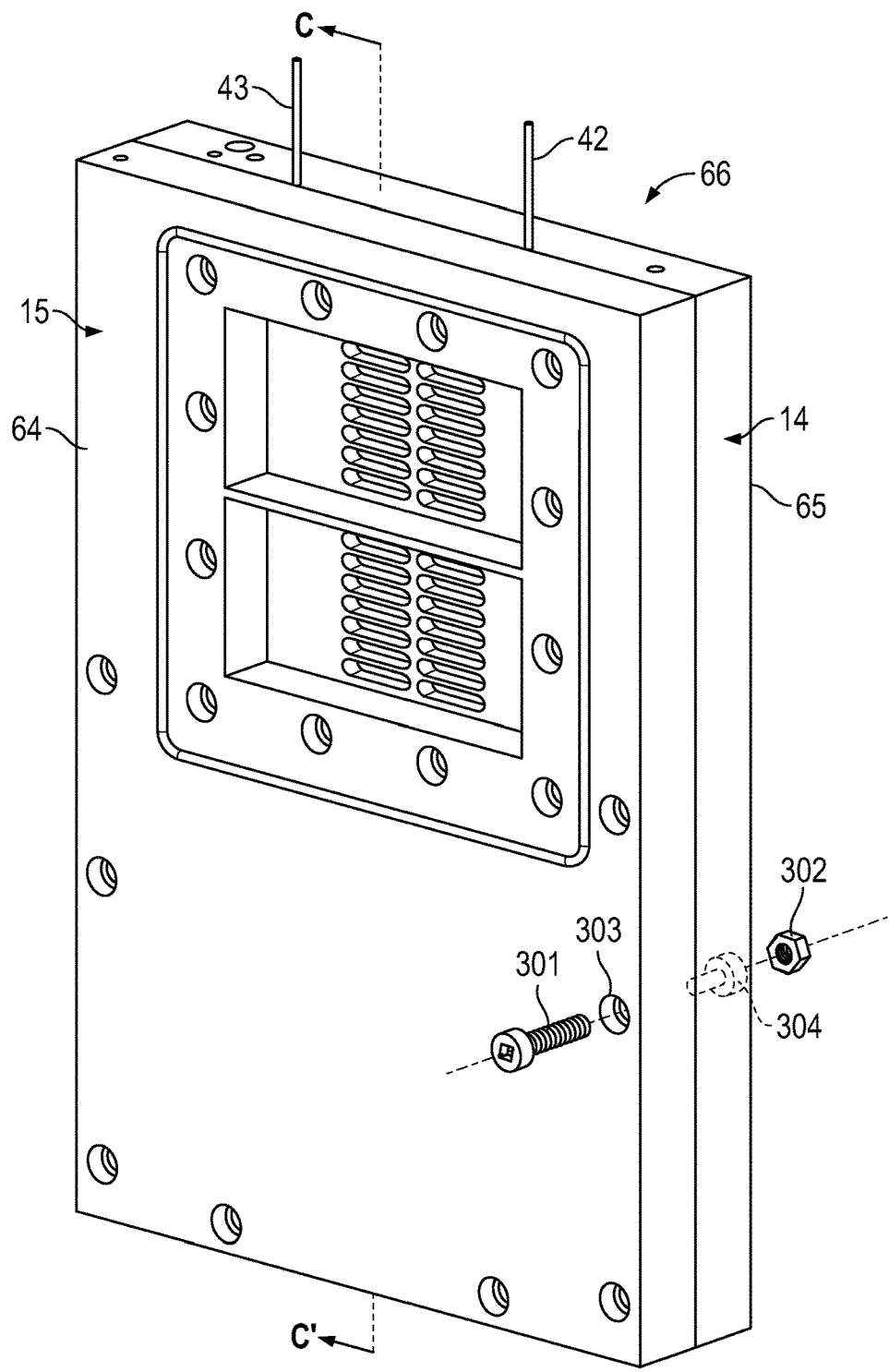
FIG. 5 is a pictorial view of the fuel cell apparatus of FIG. 3 with the air closure cover, the cover movement mechanism and a motor for a fluid pump removed so as to show an assembled plate assembly.
Figure 7:
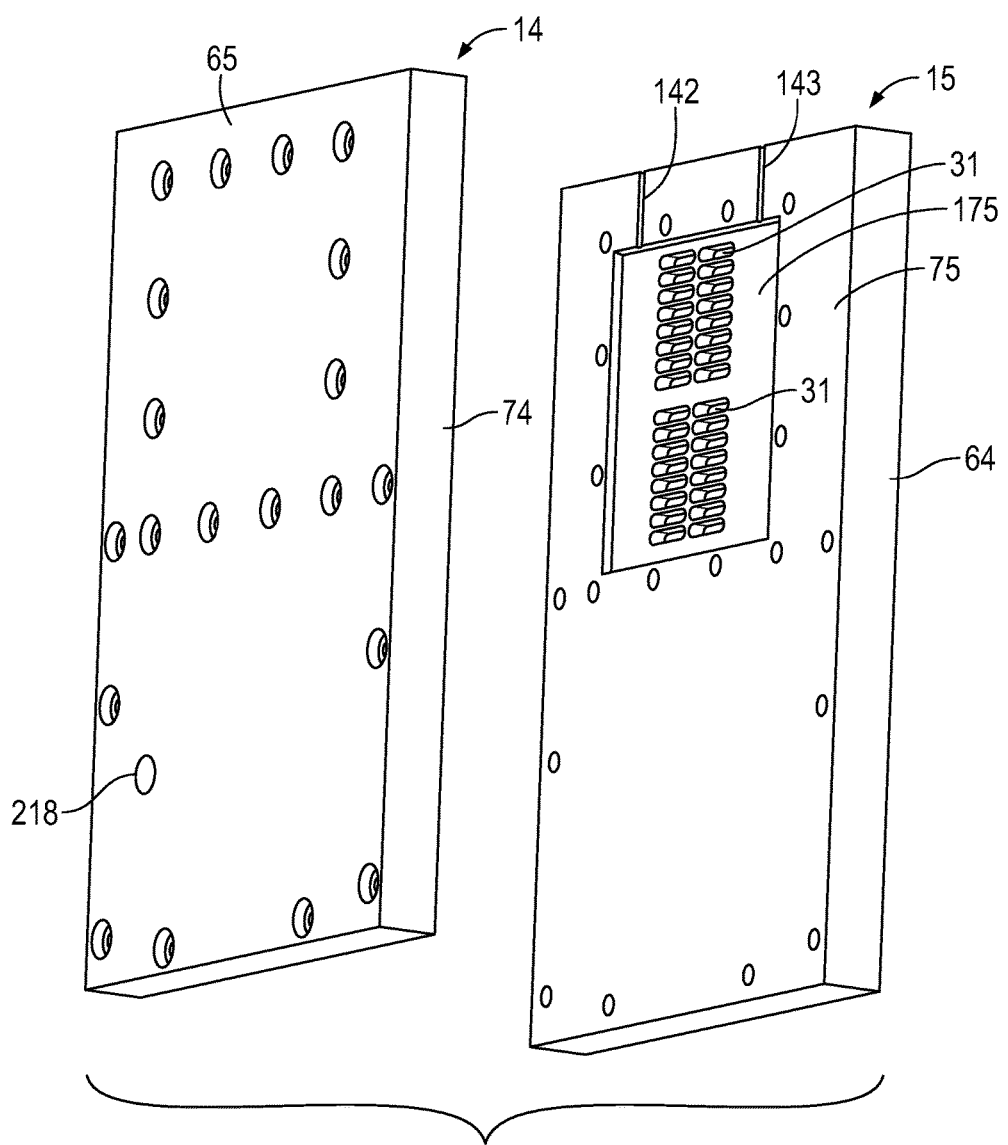
FIG. 7 is an exploded pictorial rear view of the cathode end plate and the anode end plate of FIG. 6.

Reference is made to FIG. 5 which illustrates a pictorial view of the fuel cell arrangement of FIG. 3 but with the air closure cover 50, the cover motor 52, the linkage assembly 53 and the pump motor 48 removed for ease of illustration. FIG. 5 shows what is referred to as an assembled plate assembly 66. The components of the plate assembly 66 which are visible in FIG. 5 are notably the anode end plate 14 and the cathode end plate 15. The anode lead wire 42 and the cathode lead wire 43 are shown extending upwardly from between the anode end plate 14 and the cathode end plate 15. The anode end plate 14 and the cathode end plate 15 are fixedly secured together as by various fasteners which extend through complementary openings provided through the cathode end plate 14 and the anode end plate 14 from an outer face 64 of the cathode end plate 15 to an outer face 65 of the anode end plate 14. In FIG. 7, one threaded bolt 301 and one complementary nut 302 are shown in exploded view as arranged for coupling through aligned openings 303 and 304 through the plates 14 and 15.

Figure 6:
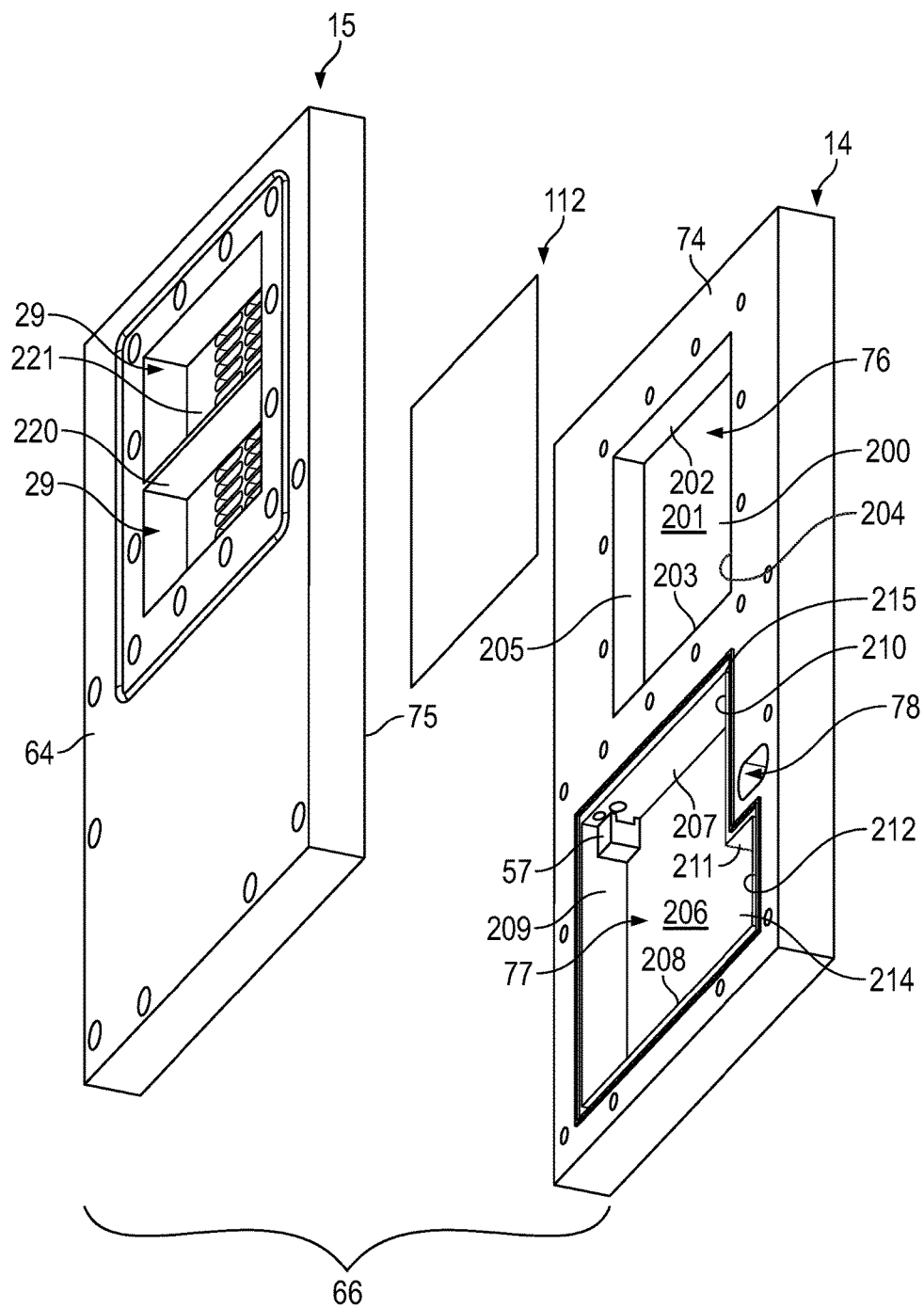
FIG. 6 is an exploded pictorial front view of the plate assembly of FIG. 5 with a fluid pump removed.
Figure 11:
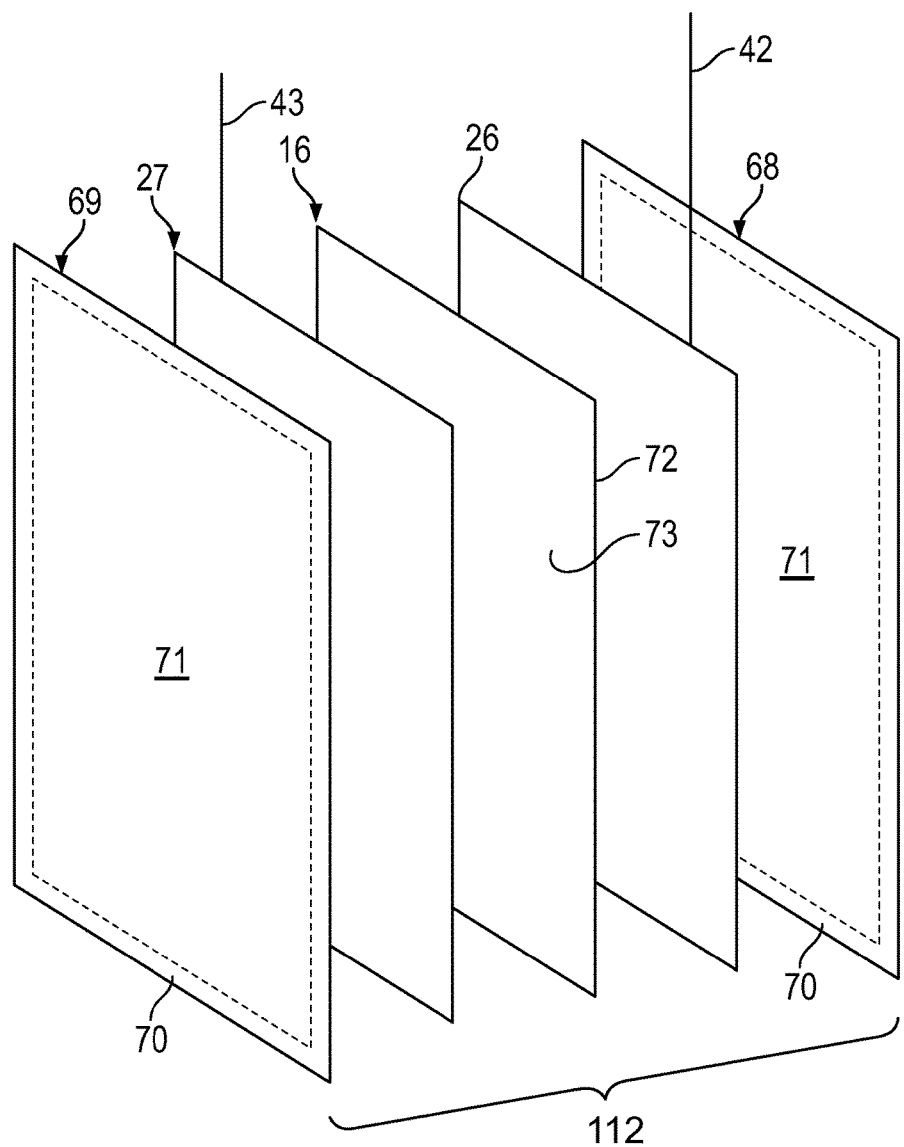
FIG. 11 is a schematic pictorial view of the layered assembly shown in FIG. 6.

Reference is made to FIG. 6 which shows an exploded front view of the plate assembly 66 shown in FIG. 5. FIG. 6 shows a layered assembly 112 that is received between the cathode end plate 15 and the anode end plate 14. Referring to FIG. 11, the assembly 112 is schematically shown. The MEA 16 is shown as a relatively thin rectangular sheet. On opposite sides of the MEA 16 are the anode current collector 26 and the cathode current collector 27, each of which in the form of a rectangular sheet of similar size to the MEA 16. Each of the anode current collector 26 and the cathode current collector 27 are preferably a conductive mesh or screening, preferably of stainless steel and which provides both mechanical support and an electrode to which the respective anode lead wire 42 with the cathode lead wire 43 may be mechanically and electrically secured. Each of the anode current collector 26 and the cathode current collector 27 suitably permit air and fuel and other materials to pass there through as between the air chamber 29 and the MEA 16 on the anode side 72 of the MEA 16 and as between the anode fuel chamber 28 and the MEA 16 on the cathode side 73 of the MEA 16.

Figure 12:
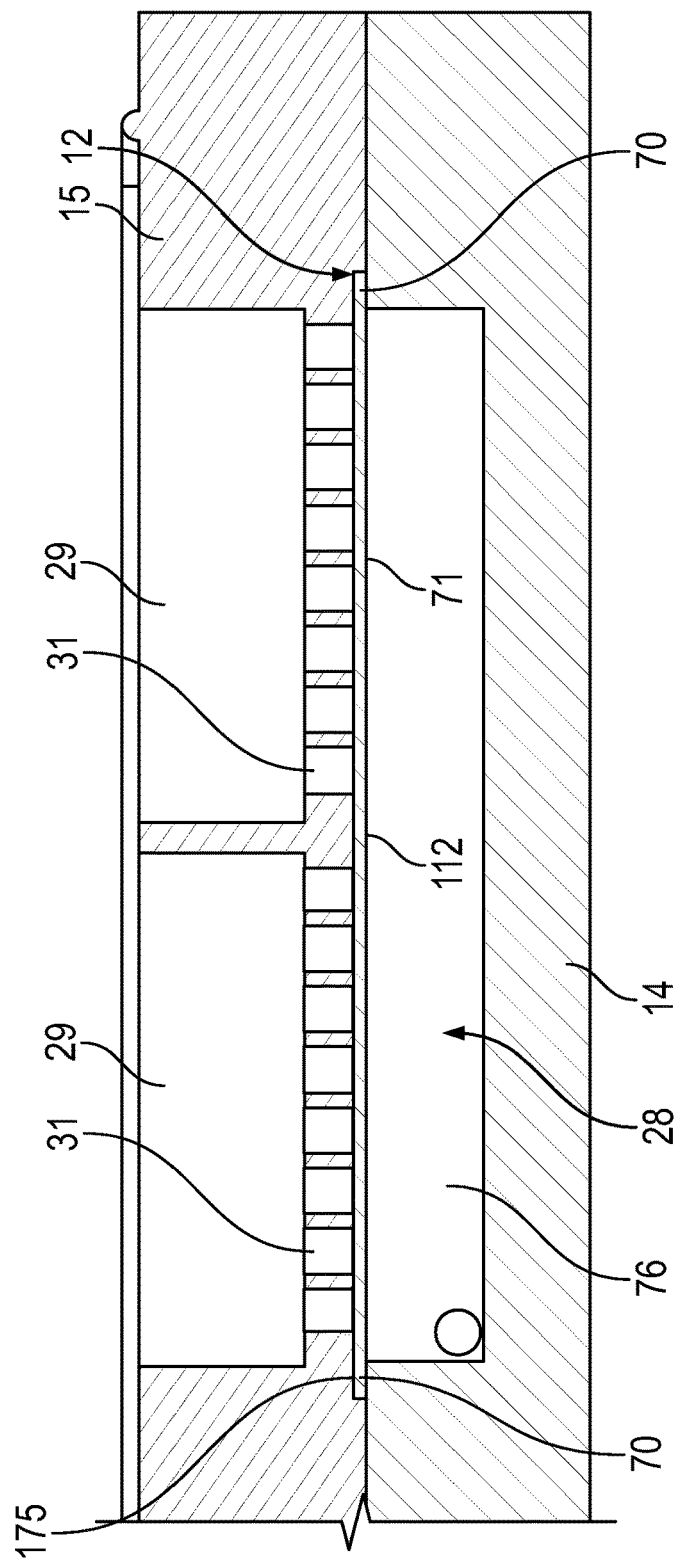
FIG. 12 is a partial cross-sectional side view of the assembled plate assembly along section line C-C' in FIG. 5.

Outwardly of the anode current collector 26 and the cathode current collector 27 are provided an anode seal 68 and a cathode seal 69, respectively. Each of the seals 68 and 69 is also shown as a rectangular sheet, however, of a size both in width and height larger than the rectangular sheets forming the MEA 16, the anode current collector 26 and the cathode current collector 27. On each of the seals 68 and 69, there is a border portion 70 between their circumferential edges and a dashed line. The border portion 70 of the anode seal 68 is adapted to engage and seal to the border portion 70 the cathode seal 69 forming an impermeable seal circumferentially thereabout. A central portion 71 of each of the seals 68 and 69 inside the border portion 70 is provided so as to suitably permit air and fuel and other materials to pass there through as between the air chamber 29 and the MEA 16 on the anode side 72 of the MEA 16 and as between the anode fuel chamber 28 and the MEA 16 on the cathode side 73 of the MEA 16. The joined border portions 70 of the seals 68 and 69 are sized to be complementary to the circumferential extent of a cell cavity 175 in the inner face 75 of the cathode end plate 15 shown on FIG. 7. As best seen in FIG. 12, the joined border portions 70 of the seals 68 and 69 are clamped in the cavity 175 between the cathode end plate 14 and the anode end plate 15 with the central portion 71 of the seal 68 open in to a fuel cavity 76 and the anode fuel chamber 28 in the anode end plate 14 and the central portion 71 of the seal 69 open to the atmosphere air via air openings 31 and the air chamber 29 in the cathode end plate 15. The border 70 of the seals 68 and 69 sealably engages about the fuel cavity 76 preventing communication between the anode fuel chamber 28 and the air chamber 29 other than through the central portions 71 of the seals 68 and 69 and thereby through various layers of the layered assembly 112 including the MEA 16.

Referring to FIGS. 6 and 7, the anode end plate 14 has an inner face 74 disposed substantially in a flat plane and the cathode end plate 15 has an inner face 75 also disposed in a substantially flat plane other than over the cavity 175 and where two channels 142 and 143 are provided to accommodate the lead wires 42 and 43. The inner face 74 of the cathode end plate 14 is adapted to be maintained in engagement with the inner face 75 of the cathode end plate 15 in assembly of the plate assembly 66 with the layered assembly 112 therebetween.

Referring to FIG. 6, the anode end plate 14 has three cavities defined therein, namely, a fuel cavity 76, a reservoir cavity 77 and a pump cavity 78.

Proximate the upper end of the anode end plate 14, the fuel cavity 76 is provided. The fuel cavity 76 has a rectangular configuration having a rectangular outer wall 201, a top wall 202 a bottom wall 203, a right side wall 204 and left side wall 205. The fuel cavity 76 defines an enclosed cavity open at an opening 200 through the inner face 74 of the anode end plate 14 as seen in FIG. 6.

The anode end plate 14 carries the reservoir cavity 77 below the fuel cavity 76. The reservoir cavity 77 has an outer wall 206 and a top wall 207, bottom wall 208, left side wall 209 and a right side wall including portions 210, 211 and 212 of which portion 211 is horizontal as shown. The reservoir cavity 77 opens outwardly as an opening 214 through the inner face 74 of the anode end plate 14. A sealing bead 215 is provided in the inner face 74 of the anode end plate extending circumferentially about the opening 214 of the reservoir cavity 77. The sealing bead 215 assists in engagement with the inner face 75 of the cathode end plate 15 when the cathode end plate 15 and the anode end plate 14 are drawn together so as to provide a fluid impermeable seal therebetween. With the anode end plate 14 and the cathode end plate 15 secured together, the opening 214 of the reservoir cavity 77 is enclosed by the inner face 75 of the cathode end plate 15 is forming the reservoir 34 cavity therebetween.

Figure 8:
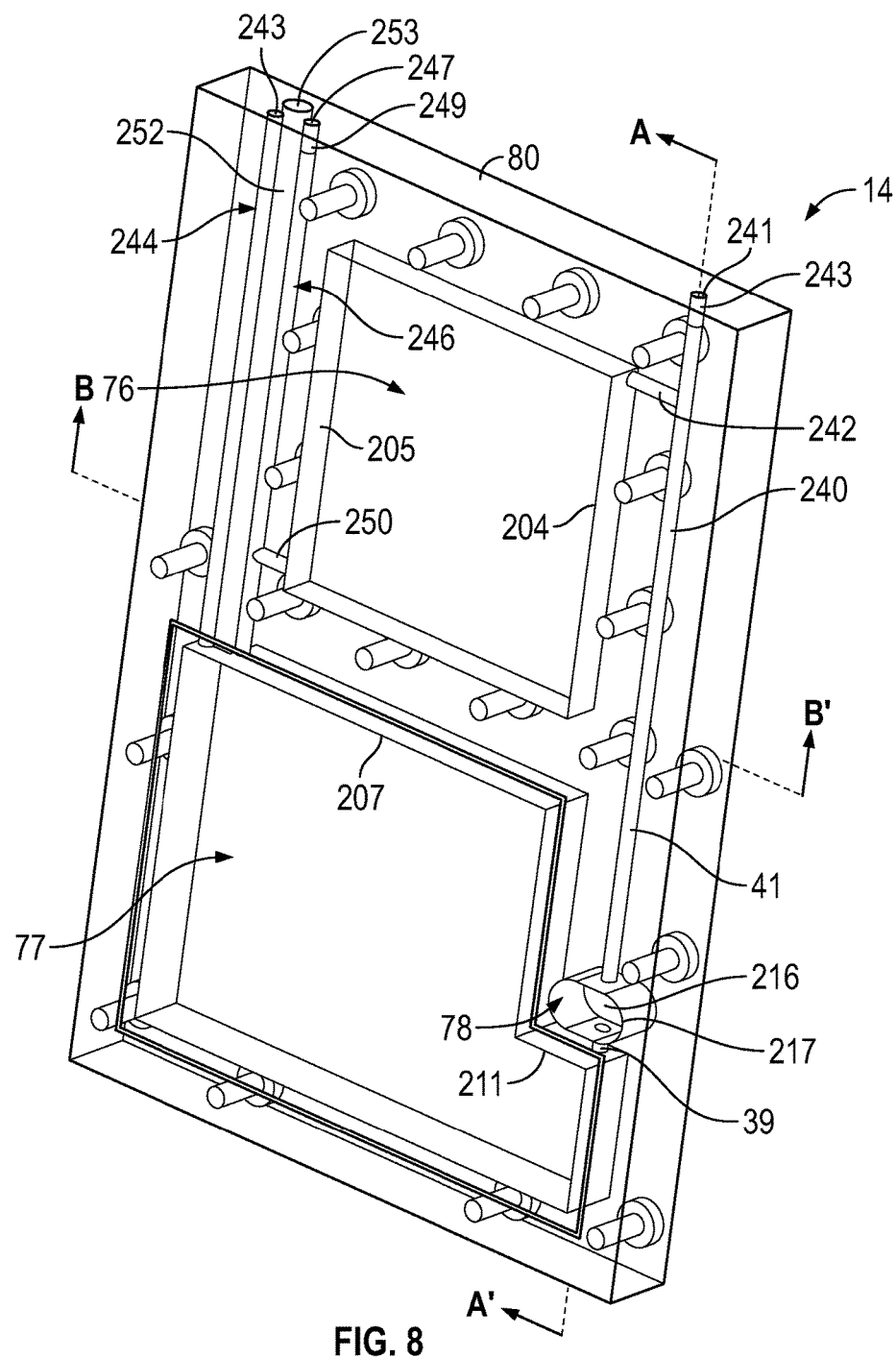
FIG. 8 is a pictorial front view of the anode end plate of FIG. 7, however, drawn as though the material forming the anode end plate is transparent.

As can be seen in FIG. 8, a pump cavity 78 is also formed in the anode end plate 14. The pump cavity 78 has an outer wall 216 and an oval peripheral side wall 217 with a pump opening 218 through the inner face 74 the anode end plate 14. The structure of the pump cavity 78 is described later in greater detail with reference to FIGS. 13 to 15.

As can be seen from FIGS. 6 and 7, the outer face 64 of the cathode end plate 15 had a pair of air chambers 29 defined therein separated by a horizontally extending support flange 220. Each air chamber 29 has an outwardly facing inner wall 221 ordered by respective top, bottom, left side and right side walls 222, 223, 224 and 225, respectively. A plurality of air openings 31 are provided from the inner wall 21 through the cathode end plate 15 to the inner face 75. As can best be seen in a comparison of the front view of FIG. 6 and the rear view of FIG. 7, each of these air openings 31 is located in registry with the fuel cavity 76. When the layered assembly 112 is engaged within the fuel cavity 76, the air openings 31 provide communication from the air chamber 29 to the central portions 71 of the cathode seal 69.

Figure 9:
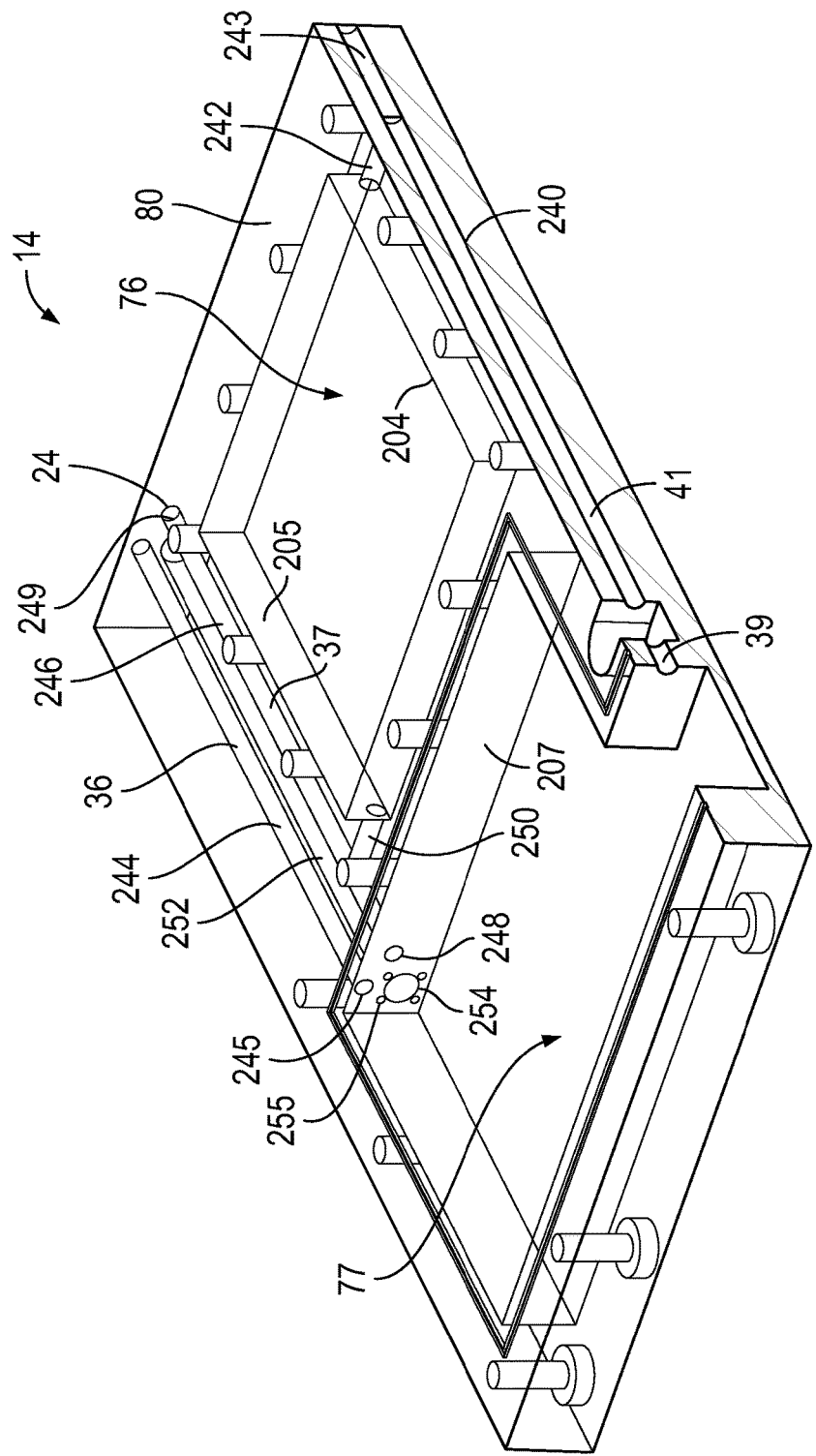
FIG. 9 is a partially cross-sectioned pictorial front side view of the transparent anode end plate of FIG. 8 along section line A-A' in FIG. 8.
Figure 10:
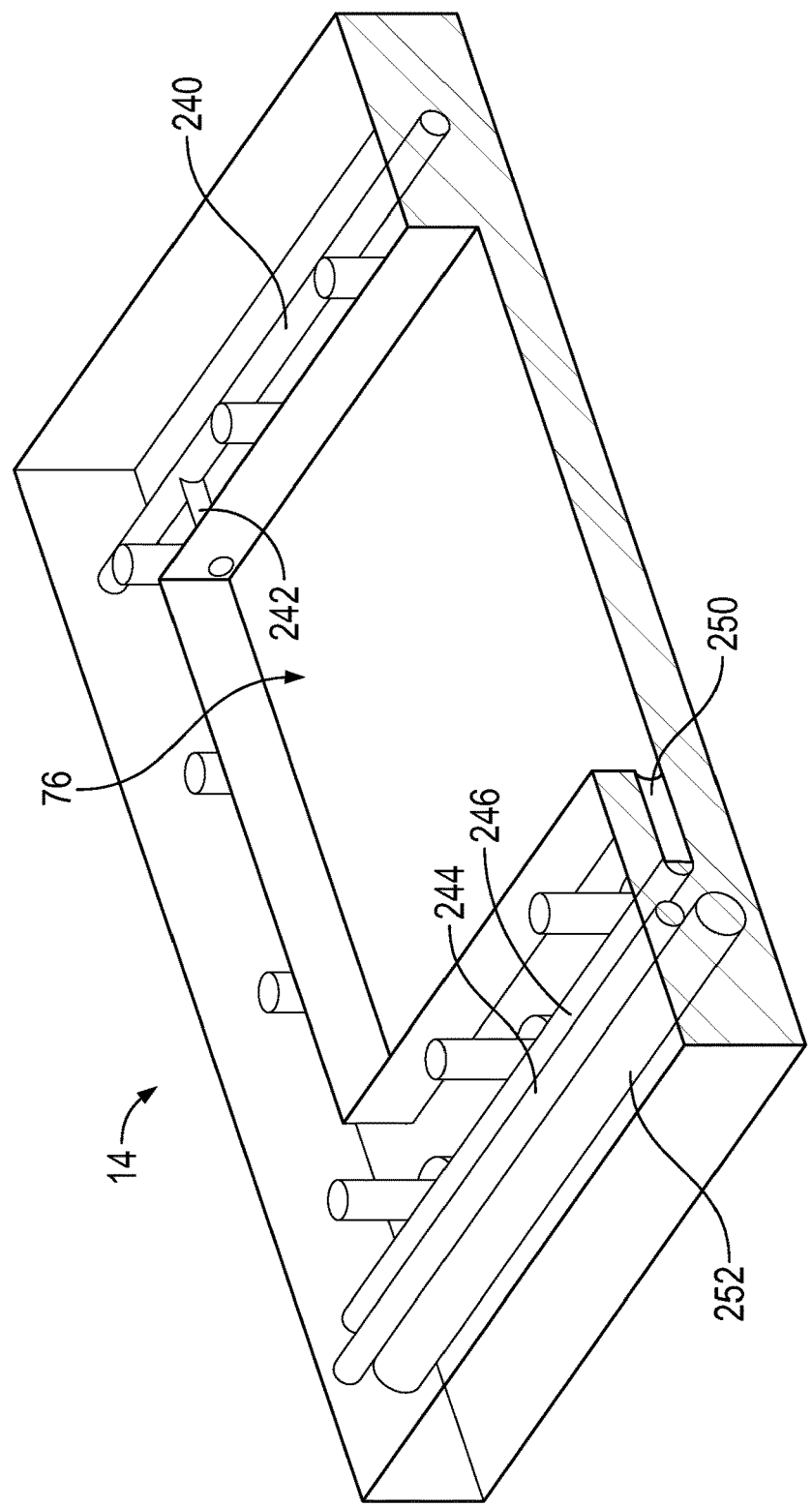
FIG. 10 is a partially cross-sectioned pictorial front bottom view of the transparent anode end plate of FIG. 8 along cross-section line B-B' in FIG. 8.

Reference is made to FIGS. 8 to 10 which illustrate the anode end plate 14 as advantageously formed from a single unitary member of preferably of plastic or other non-electrically conducting material and from which selected portions of the material are removed to provide desired structures such as the cavities and passageways. In FIGS. 8 to 10 for ease of illustration, the anode end plate 14 is schematically shown as though the anode end plate 14 is formed from a transparent material.

In a top wall 80 of the anode end plate 14 the upper ends of four vertically extending bores are shown.

A vertical pump bore 240 extends from the top wall 80 through pump cavity 78 to the horizontal portion 210 of the side wall of the reservoir cavity 77. The vertical pump bore 240 opens at the top wall 80 as a pump bore upper opening 241. A horizontal pump bore 242 is cut from the fuel cavity 76 right side 204 horizontally to the vertical pump bore 240. A separate element, a pump bore plug 243, is engaged within the upper end of the vertical pump bore 240 after the vertical pump bore 240 is formed to sealably close the vertical pump bore 240 against fluid flow. The vertical pump bore 240 above the pump cavity 78 and the horizontal pump bore 242 form the discharge passageway 41. The vertical pump bore 240 below the pump cavity 78 forms the feed passageway 39. When the fuel pump 40 is received within the pump cavity 78, operation of the fuel pump 40 draws fluid from the reservoir cavity 77 and discharges fuel into the fuel cavity 76 by flow through the vertical pump bore 240 and the horizontal pump bore 242. FIG. 10 illustrates a cross-sectional view centered on the vertical pump bore 240 and best showing the passageways 39 and 41 and the pump bore plug 243. The pump bore 240 is disposed laterally to the right side of the fuel cavity 76 and does not interfere with the fuel cavity 76.

A vertical drain bore 246 extends vertically downwardly from the top wall 80 through the top wall 207 into the reservoir cavity 77. The vertical drain bore 246 opens at an upper opening 248 in the top wall 80 of the anode end plate 14. A separate element, a drain bore plug 249, is received and closes the opening 248 to fluid flow after the vertical drain bore 246 is formed to sealably close the vertical drain bore 246 against fluid flow. A horizontal drain bore 247 extends from the left side wall 205 of the fuel cavity 76 horizontally into the vertical drain bore 246. The vertical drain bore 246 and the horizontal drain bore 247 define the drain passageway 37 for communication between the fuel cavity 76 and the reservoir cavity 77. The drain bore 244 is disposed laterally to the left side of the fuel cavity 76 and does not interfere with the fuel cavity 76.

A vent bore 244 extends vertically downwardly from the top wall 80 through the top wall 207 into the reservoir cavity 77 providing the air vent passageway 36 therein. The vent bore 244 opens through the top wall 207 of the reservoir cavity 77 as an opening 245. The vent bore 244 is disposed laterally to the left side of the fuel cavity 76 and does not interfere with the fuel cavity 76.

Figure 17:
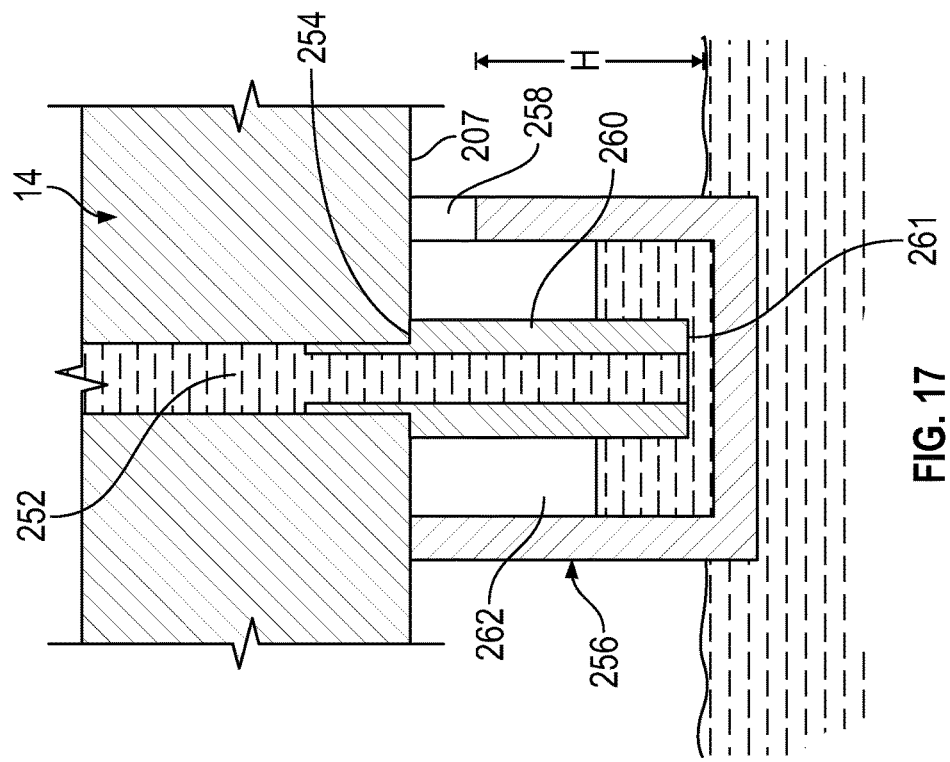
FIG. 17 is a partial cross-sectional view through the feeder of FIG. 16 when s coupled to the anode end plate as in FIG. 6.
Figure 16:
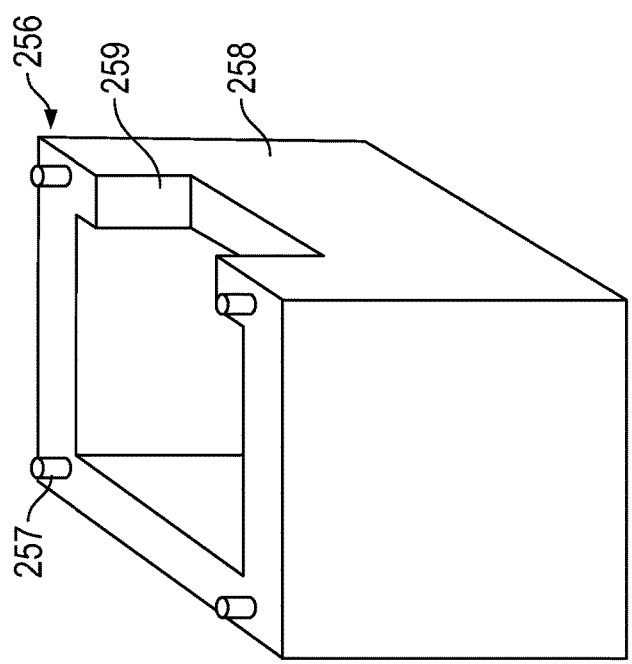
FIG. 16 is a pictorial view of a liquid feeder of the fuel cell of FIG. 6.

A supply bore 252 extends vertically downwardly from the top wall 80 through the top wall 207 into the reservoir cavity 77 providing the supply passageway 56 therein. The supply bore 252 is disposed laterally to the left side of the fuel cavity 76 and does not interfere with the fuel cavity 76. The supply bore 252 opens through the top wall 207 of the reservoir cavity 77 as an opening 254. The top wall 207 of the reservoir cavity 77 has about the opening 247 four short blind bores 255. A separate element, a sump box member 250 is shown by itself in FIG. 16 and coupled to the anode end plate 14 in FIGS. 6 and 17. The sump box member 250 carries four upwardly extending securing pegs 257 adapted to be frictionally received within the blind bores 248 to secure the sump box member 250 to the anode end plate 14. The sump box member 250 is a rectangular box closed on its bottom and four sides but open upwardly at its top. On one side an opening 259 is provided through a side wall 258. As can be seen in FIG. 17 in an assembled condition, another separate element, a dip tube 260 is secured in the supply bore 256 and extends downwardly to a lower end 261 of the dip tube 260. The sump box member 250 forms an enclosed feed chamber 262 about the dip tube 254 sealably engaged with the top wall 207 at its upper end and open into the reservoir merely via the opening 259. The lowermost portion of the opening 259 is at a vertical height H above the lower end 261 of the dip tube 260. On the basis that gas or vapour is provided within the fuel reservoir 34, fluid flow from the supply container 54 will only occur when a hydraulic pressure due to the height of fluid in the supply container 54 is adequate to displace fluid within the feed chamber 262 upwardly to the height of the opening 259. The sump box member 250, the dip tube 260 and the anode end plate 14 thus cooperate to form a liquid feeder, as in the manner of a known chicken feeder, and the fuel level controlling inlet valve 57 of FIG. 2.

The particular nature of the fuel level controlling inlet valve 57 is not limited and various other valve arrangements may be provided for controlling the supply of fuel from the fuel supply container 54 to the fuel reservoir 34 under gravity. It is considered preferred to provide for the fuel supply container 54 so as to provide a larger supply of fuel than the capacity of fuel reservoir 34 to increase the energy and duration that the fuel cell may operate. A separate fuel supply container 54 is not necessary and is for example not provided in the embodiment of FIG. 1. The particular nature of fuel reservoir 34 may be adjusted to its size and location and manner in which it may be incorporated into or external of the plates 14 and 15 of fuel cell arrangement 10 as in FIG. 1.

Providing for flow of fuel from the fuel supply container 54 into the fuel reservoir 34 by gravity as controlled by the fuel level controlling inlet valve 57 shown as a mechanical valve is preferred so as to not require any expenditure of the energy generated by the fuel cell as to deliver fuel from the fuel supply container 54 to the fuel reservoir 34. Alternately, with the fuel supply container 54 above the fuel reservoir 34, an electrical solenoid valve may form the fuel level controlling inlet valve 35 as controlled by the controller and with a fuel level sensor provided within the fuel reservoir 34 to determine when fuel from the fuel supply container 54 may be permitted to flow under gravity to the fuel reservoir 34, as another alternative, a supply pump may be provided to pump fuel from the fuel supply container 54 into the fuel reservoir 34 as controlled by the controller with a fuel level sensor within the fuel reservoir 34.

In an assembled fuel cell, as seen in FIG. 12 in cross-section, the anode fuel chamber 28 is defined inside the fuel cavity 76 outwardly of the layered assembly 112 effectively defining a vertically extending fluid flow field of constant cross-section within the anode fuel chamber 28 via which fuel may flow from the fuel chamber inlet 30 to the fuel chamber outlet 32. The outer wall 201 of the fuel cavity 76 is shown as disposed in a flat vertical plane. As an alternative, the outer wall 201 may be provided with a raised boss in a serpentine shape having an inwardly directed inner surface disposed in a flat plane and side surfaces such that a serpentine shaped flow channel is provided between the side surfaces leading from the fuel chamber inlet 30 to the fuel camber outlet 32.

Figure 13:
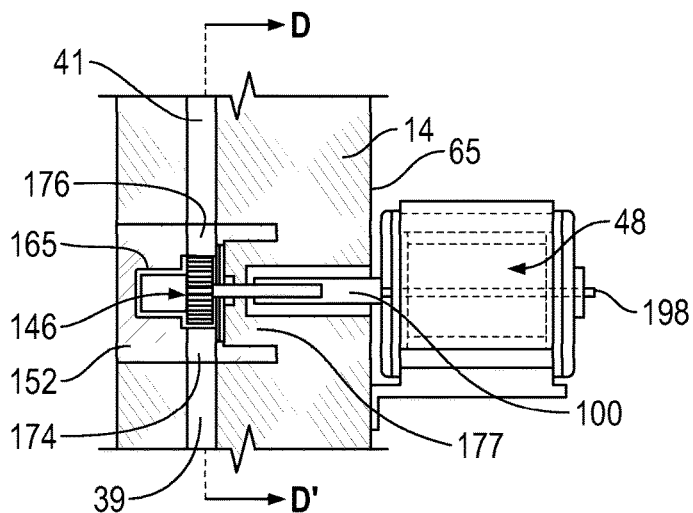
FIG. 13 is a partial cross-section side view of the anode end plate of FIG. 8 along the cross-section line A-A' but also showing a fuel pump assembly coupled to the anode plate.
Figure 14:
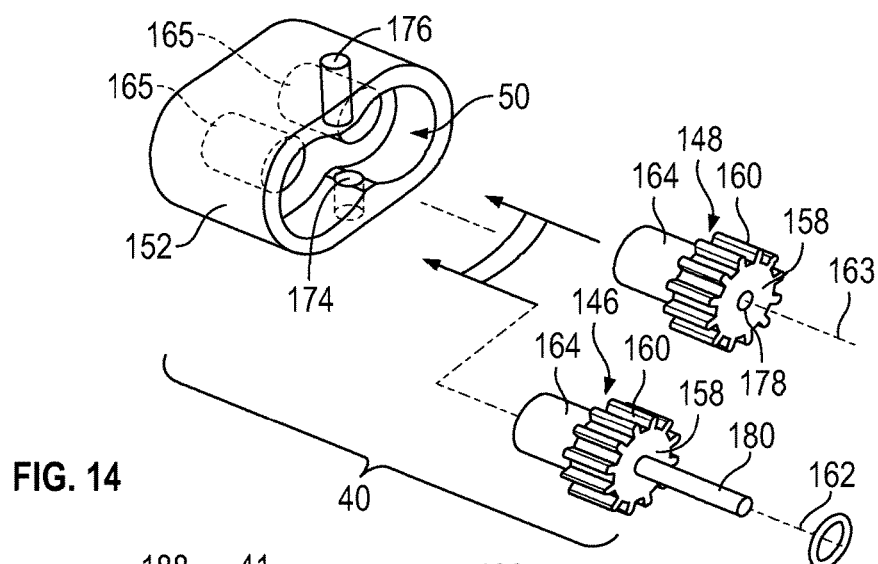
FIG. 14 is a schematic pictorial view of a pump casing, two pump gears and an O-ring of the fuel pump assembly of FIG. 13.
Figure 15:
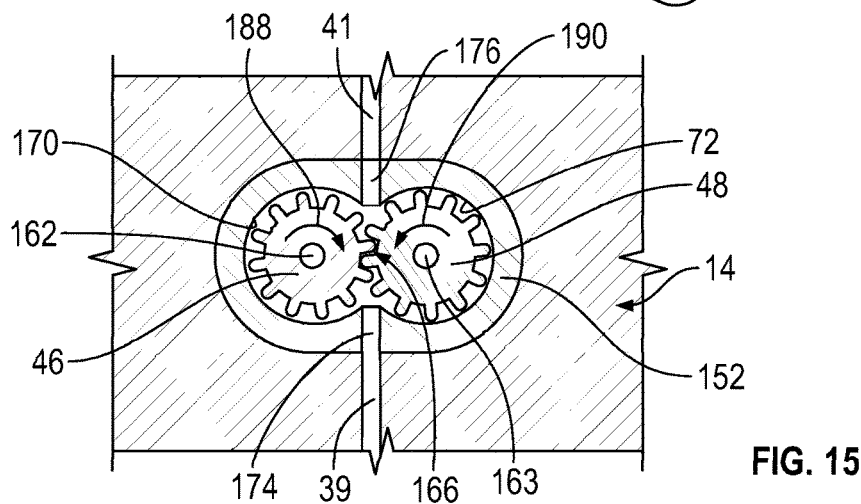
FIG. 15 is a cross-sectional view along section D-D' FIG. 13.

Reference is made to FIGS. 13 to 15 which illustrate a preferred pump arrangement for the fuel pump 40 and its pump motor 48 in accordance with the present invention. The pump arrangement has a configuration similar in many respects to that illustrated in U.S. Pat. No. 5,836,482 to Ophardt et al., issued Nov. 17, 1998, the disclosure of which is incorporated herein by reference. The fuel pump 40 is a gear type rotary pump with two inter-machine gear-like impellers, namely, a driver impeller 146 and a driven impeller 148, received in a cavity within a pump casing 152. The casing 152 is adopted to be slidably inserted in a sealed manner within the pump cavity 78 and has a complimentary shape and side. The impellers 146 and 148 are identical with each adapted to be rotated about its respective axis 162 and 163. Each impeller has a gear portion 158 disposed coaxially about the axis with radially and axially extending teeth 160. Each impeller has an axial member 164 which extends axially from the gear portion 158 and serves to assist in journaling its impeller in the cavity 150. As seen in FIG. 14, the cavity 150 is formed so as to journal the impellers 146 and 148 for rotation with the axis of the impellers parallel, with the impellers disposed beside each other and with the teeth of one impeller intermeshing with the teeth of the other impeller in a nip 166 between the impellers. The cavity 150 carries two outwardly extending blind bores 165 sized to receive and journal axle members 164 of the impellers to journal the impellers. The cavity 150 has a circumferential side wall defined by part-cylindrical forming surface 170 disposed at a constant radius from the axis 162 of the driver impeller 146 and part-cylindrical forming surface 172 disposed at a constant radius from the axis 163 of the driven impeller 148. An inlet port 174 opens through the casing 152 into the cavity 150 on the lower side of the cavity 150 below the nip 166. Fluid in the fluid reservoir 34 is in communication with the cavity 150 via the feed passageway 39. An outlet port 176 opens through the casing 152 into the cavity in an upper side of the casing 150 above the nip 166. The driver impeller 146 has an axle extension rod 180 which extends coaxially therefrom outwardly. The inner wall 216 of the motor cavity 78 has a horizontally inwardly extending projection 177 complimentary in shape to the cavity 50. A bore extends horizontally through the projection 177 through which the extension rod 180 extend outwardly. The bore includes an enlarged radius portion adapted to receive a sealing washer 178 to sealably engage the extension rod 180.

The pump motor 48 is fixedly secured to the outer face 65 of the anode end plate 14 and carries an axle 198 with a coupling 100 which extends into engagement with the extension rod 180 rotate the extension rod on rotation of the motor 48.

When the motor 180 rotates the driver impeller 146 clockwise in a direction of the arrow 188 shown in FIG. 15, the driver impeller 146 engages the driven impeller 148 to rotate the driven impeller clockwise in a direction of the arrow 190. Fluid 18 in the cavity 150 approximate the inlet port 174 is located in the space between adjacent teeth 160 of either of the impellers. On rotation of the teeth of the impellers away from the inlet port 174, the fluid between the adjacent teeth becomes impounded in spaces between the adjacent teeth 160 and the fluid so impounded is moved with rotation of each impeller circumferentially from near the inlet port 74 upwardly to the outlet port 176. The intermeshing of the teeth 160 of the two gear-like portions in the nip 166 between the impellers substantially displaces fluid from the spaces between the teeth in the nip 166 so as to in effect to prevent fluid from passing between the gear-like portions in the nip.

The particular nature of the pump motor showing is but one form of a pump which can be conveniently adapted. Rather than coupling the motor to the driven impeller via shaft that extends through the anode end plate 14 and requires a seal, a magnetic coupling may be provided. Various other motors and various other fluid pump arrangements can be provided without departing from the scope of the invention.

In accordance with a preferred operation of the fuel cell 10 of the first and second embodiments the present invention, the liquid fuel is recirculated by the fuel pump 40 through the anode fuel chamber 28 and back to the fuel reservoir 34. This effectively is a closed circuit but for any additional fuel which may be supplied from the fuel supply container 54 in the second embodiment to maintain the fuel reservoir 34 substantially filled with fluid. In the second embodiment, the fuel which may be received from the fuel supply container 54 will replace fuel which may be consumed in or evaporate from the fuel cell.

Experimental Results

A fuel cell as shown in FIGS. 3 to 17 was operated under varying configurations and conditions.

In a first preferred configuration:

(a) The active surface area of the air and the fuel compartment were 50 $cm^2$ each.

(b) The volume of the anode fuel chamber 28 was approximately 2 $cm^3$.

(c) The volume of the fuel reservoir 34 was approximately 2 $cm^3$. The fuel was supplied from the fuel reservoir (approximately 2 $cm^3$) and the spent fuel was discarded.

(d) The pumping capacity of the fuel pump was approximately 1000 ml per minute. Pumping was controlled by a timer, and approximately 5 $cm^3$ were pumped every twenty minutes.

(e) The fuel cell was operated at ambient room temperatures of about 20 degrees Celsius.

(f) The liquid fuel consisting of 70% by volume isopropanol and 30% by volume water was used the following operational.

(g) The fuel cell was operated to produce electricity provided the open circuit potential was above approximately 380 mV.

(h) The fuel cell was operated in intervals with load on for 60 seconds and load off for 60 seconds.

(i) In a second series of experiments, the intervals were modified as follows: load on for 30 seconds and load off for 60 seconds.

(j) The fuel cell was connected to a dc/dc converter in order to recharge a buffer battery (consisting of four NiMH cells).

(k) The fuel cell was operated so as to maintain a stable battery voltage of approximately 5V.

(l) This fuel cell was operated in excess of five months.

Figure 18:
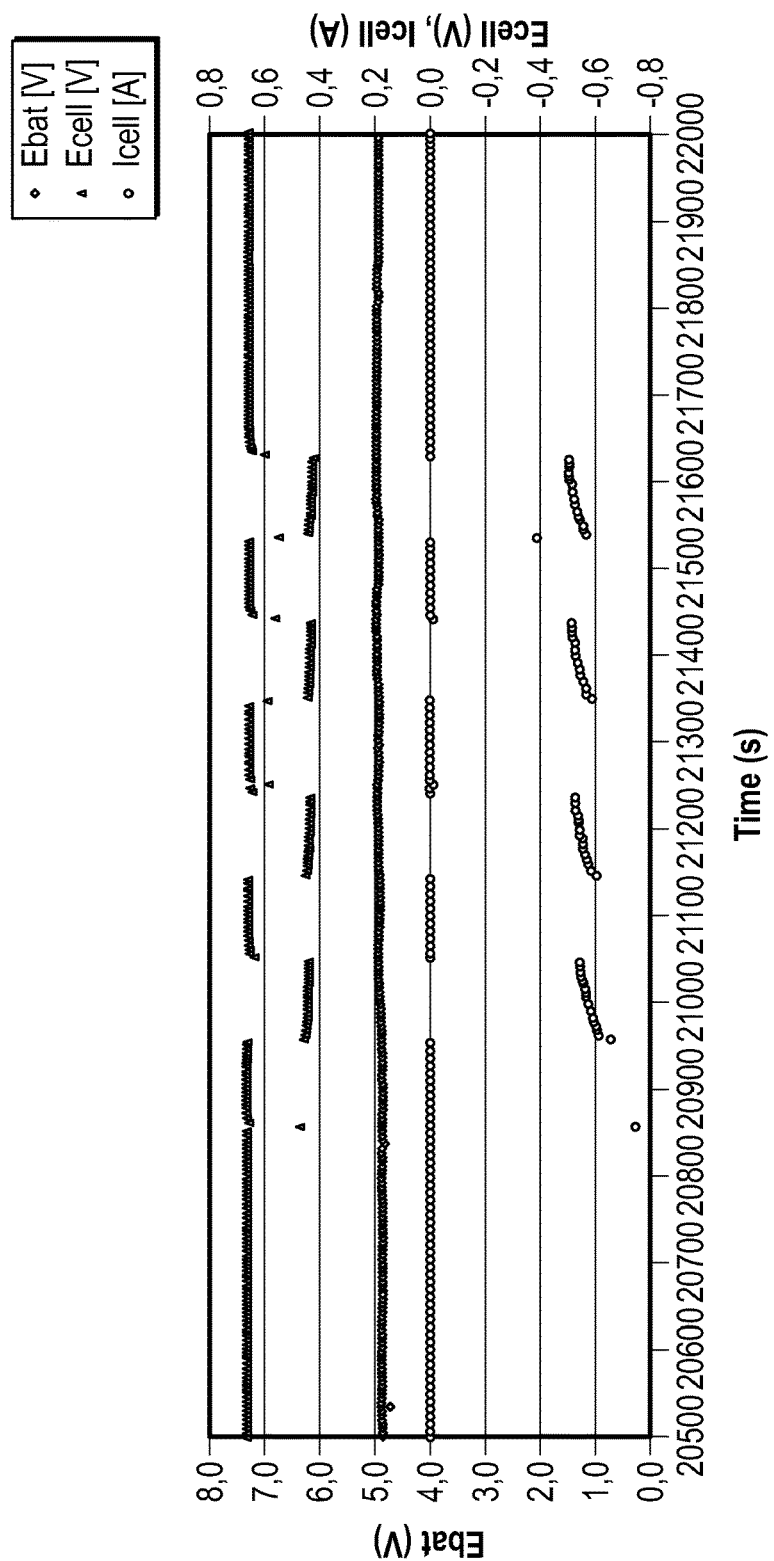
FIG. 18 is a graph showing during operation of a first configuration of a fuel cell in accordance with the present invention for a period of time shortly after start-up of the fuel cell, the fuel cell voltage, the fuel cell current and the voltage of the buffer battery as measured at different points in time.

(m) FIG. 18 shows the fuel cell voltage (Ecell [V]), the fuel cell current (Icell [A]) and the voltage of the buffer battery (Ebat [V]) during a charging period of Time in seconds shortly after fuel cell start-up.

Figure 19:
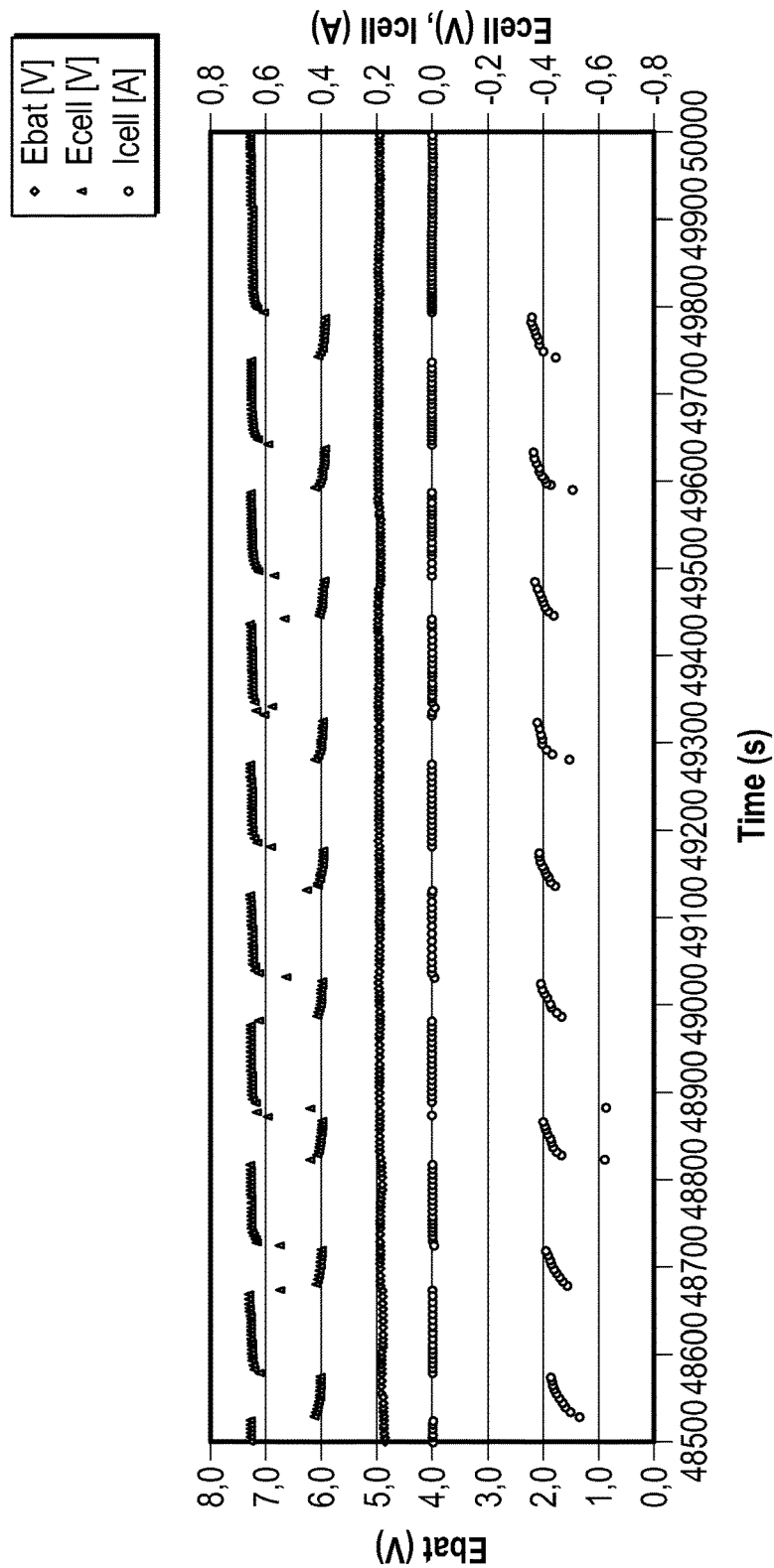
FIG. 19 is a graph showing, for the same fuel cell as in FIG. 18, during operation for a period of time after operation of the fuel cell of almost six months following the start-up of the fuel cell, the fuel cell voltage, the fuel cell current and the voltage of the buffer battery as measured at different points in time.

(n) FIG. 19 shows the same fuel cell after a period of operation of almost six months showing the fuel cell voltage (Ecell [V]), the fuel cell current (Icell [A]) and the voltage of the buffer battery (Ebat [V]) during a period of Time in seconds.

In a second preferred configuration:

(a) The active surface area of the air and the fuel compartment were 50 $cm^3$.

(b) The volume of the anode fuel chamber 28 was approximately 2 $cm^3$.

(c) The liquid fuel consisting of 70% by volume isopropanol and 30% by volume water was used the following operational.

(d) The fuel was supplied from a reservoir 34 with approximately 300 $cm^3$ volume and the spent fuel was recycled to this reservoir.

(e) A feeder 57 was used to refill the reservoir 34 automatically from a fuel tank 54 with a volume of 300 $cm^3$.

(f) The pumping capacity of the fuel pump was approximately 1000 ml per minute. Pumping was controlled by a timer, and approximately 5 $cm^3$ were pumped every ten minutes.

(g) The fuel cell was operated at ambient room temperatures of about 20 degrees Celsius.

(h) The fuel cell was operated to produce electricity provided the potential under load was above approximately 380 mV.

(i) The fuel cell was operated in intervals with load on for 30 seconds and load off for 30 seconds.

(j) The fuel cell was connected to a dc/dc converter in order to recharge a buffer battery (consisting of four NiMH cells).

(k) The fuel cell was operated so as to maintain a stable battery voltage of approximately 5V.

(l) This fuel cell was operated in excess of six weeks.

Figure 20:
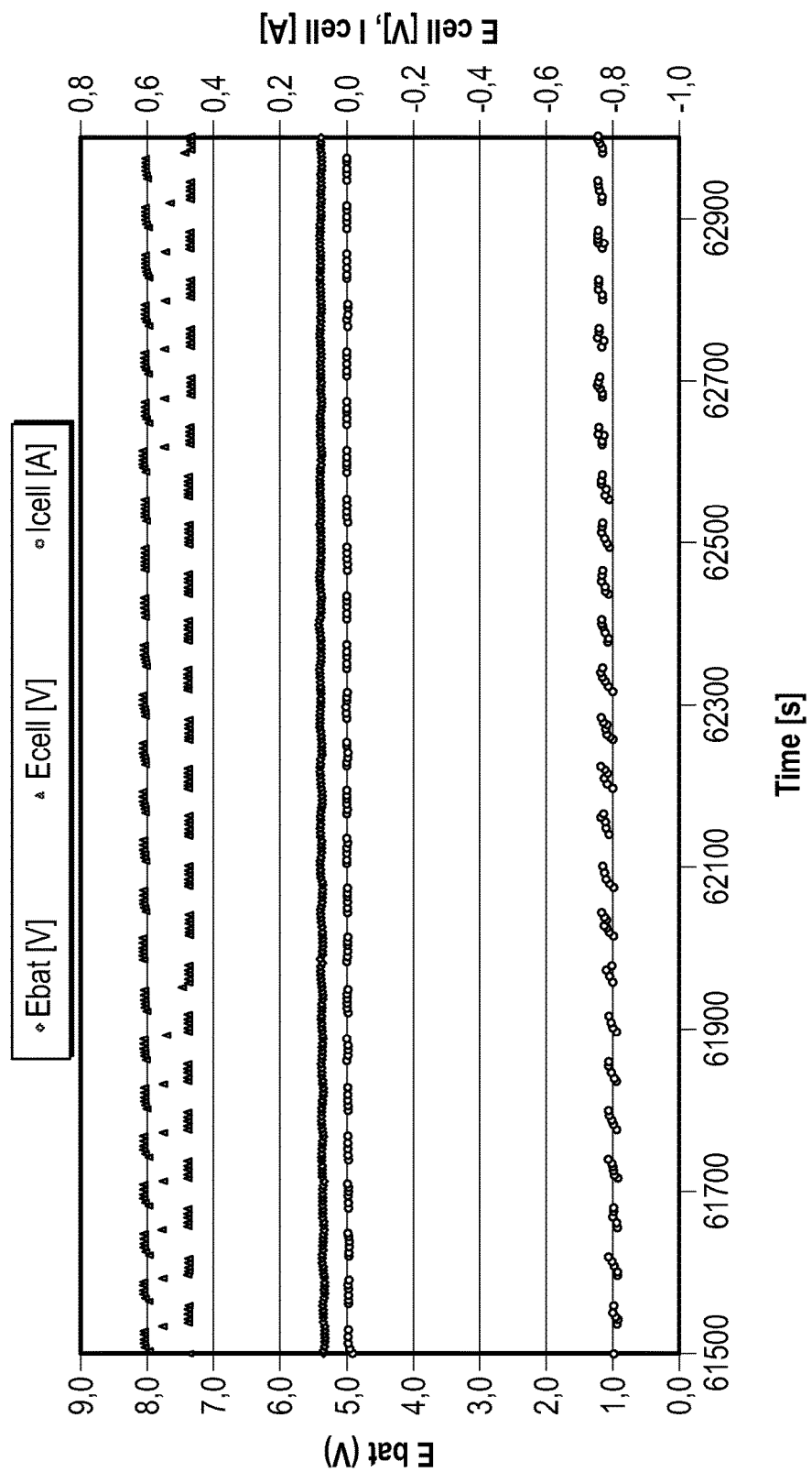
FIG. 20 is a graph showing during operation of a second configuration of a fuel cell in accordance with the present invention for a period of time shortly after start-up of the fuel cell, the fuel cell voltage, the fuel cell current and the voltage of the buffer battery as measured at different points in time.

(m) FIG. 20 shows the fuel cell voltage (E cell [V]), the fuel cell current (I cell [A]) and the voltage of the buffer battery (E bat [V]) during a charging period shortly after fuel cell start-up during a period of Time in seconds.

Figure 21:
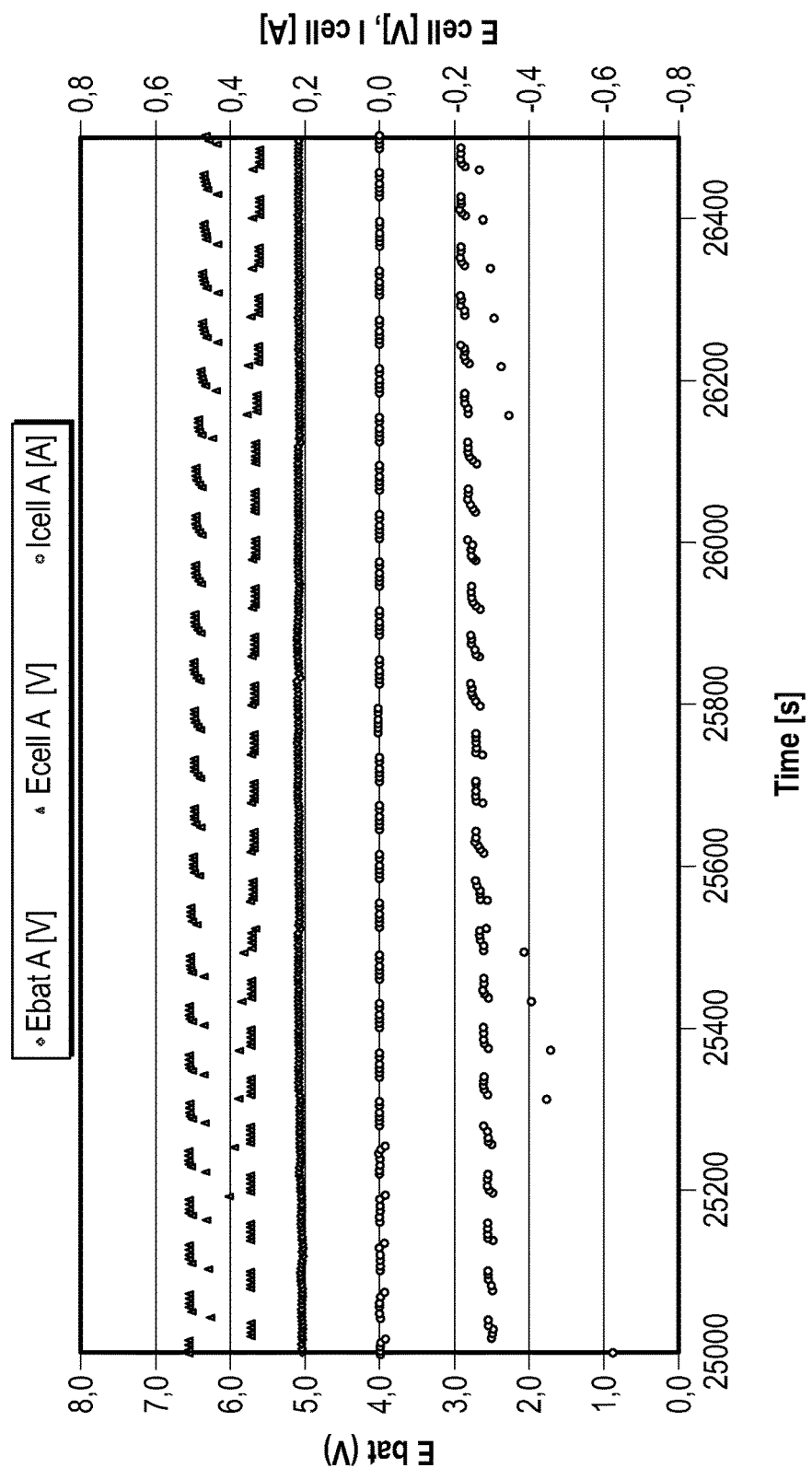
FIG. 21 is a graph showing, for the same fuel cell as in FIG. 20, during operation for a period of time after operation of the fuel cell of almost six weeks following the start-up of the fuel cell, the fuel cell voltage, the fuel cell current and the voltage of the buffer battery as measured at different points in time.

(n) FIG. 21 shows the same fuel cell after a period of operation of almost six weeks swing the fuel cell voltage (E cell [V]), the fuel cell current (I cell [A]) and the voltage of the buffer battery (E bat [V]) during a charging period shortly after fuel cell start-up during a period of Time in seconds.

Figure 22:
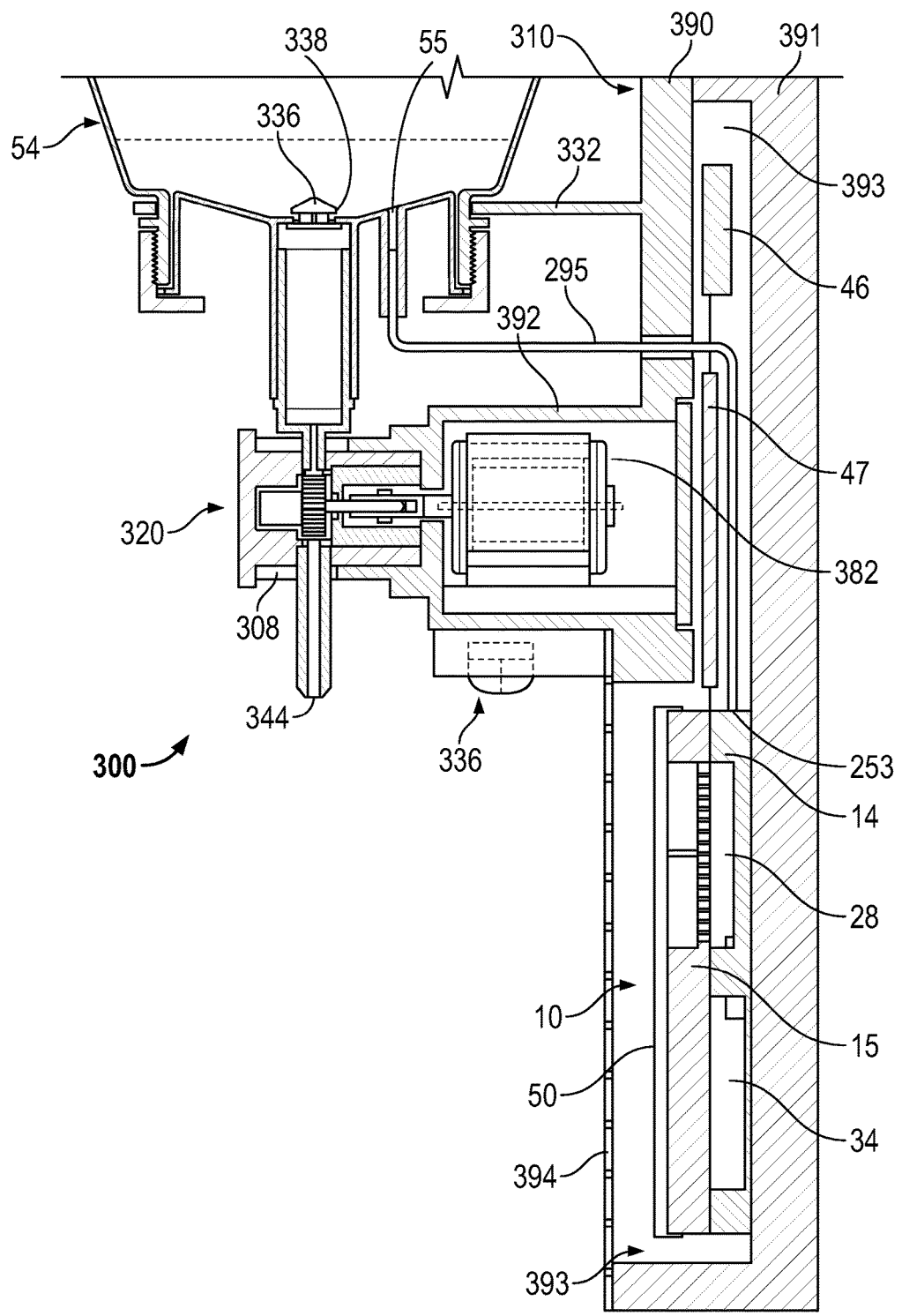
FIG. 22 is a schematic view of a fuel cell arrangement in combination of a fluid dispenser in accordance with a third embodiment of the present invention.
Figure 23:
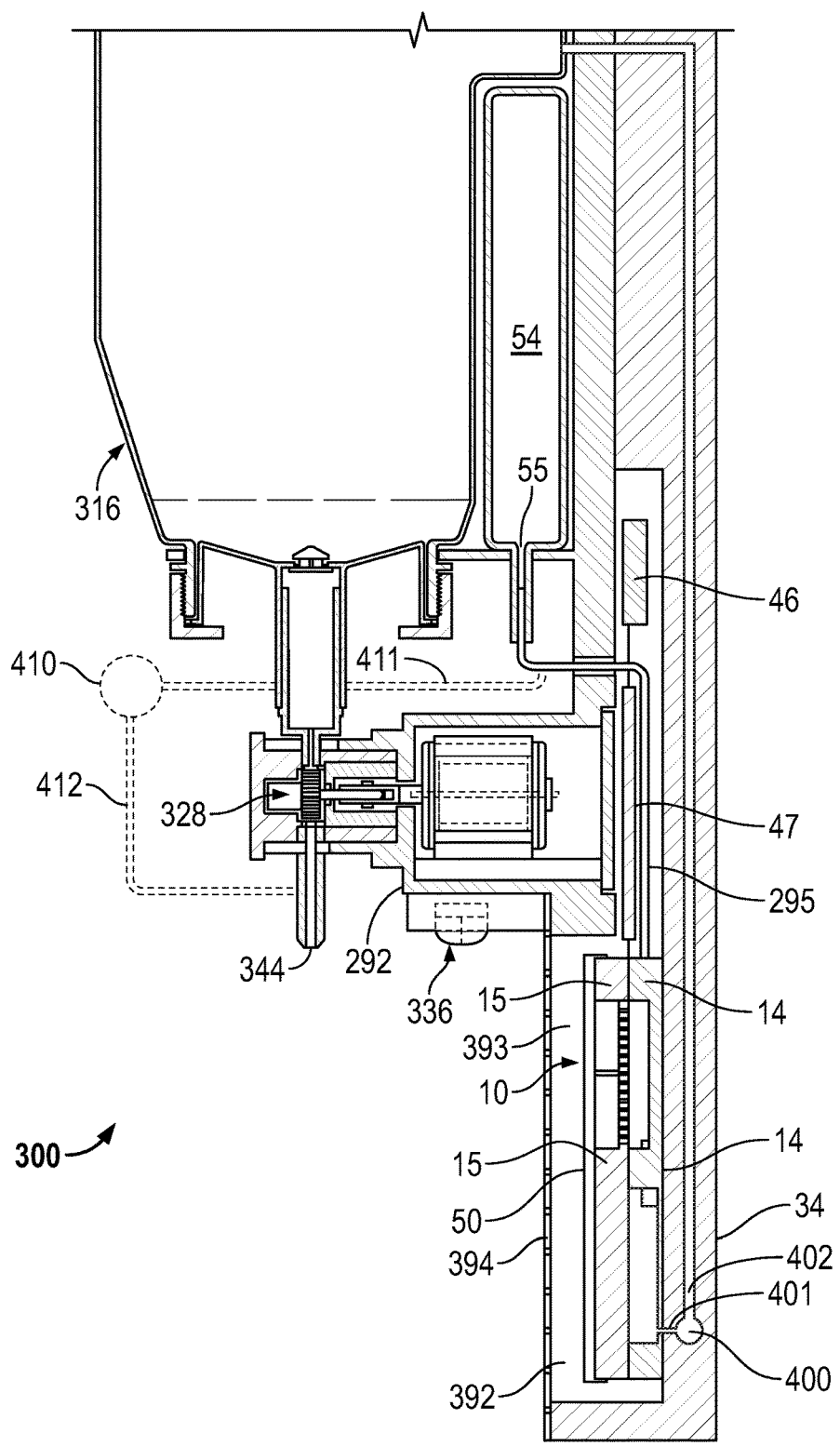
FIG. 23 is a schematic view of a fuel cell arrangement in combination with a fluid dispensing arrangement in accordance with a fourth embodiment of the present invention.

Reference is made to FIG. 22 which illustrates as a third embodiment of the present invention a hand cleaning fluid dispenser 300 incorporating a fuel cell arrangement. FIG. 23 illustrates a vertical cross-sectional view through the fluid dispenser 300. The fluid dispenser 300 has a configuration substantially identical to that taught by above-noted U.S. Pat. No. 5,836,482, however, with a notable exception that a fuel cell arrangement is incorporated into the dispenser. The fuel cell arrangement 10 as shown in side view of FIG. 22 is the same as the fuel cell arrangement of FIGS. 3 to 17.

The dispenser 300 includes a fluid container 54 and, in this regard, the fuel cell arrangement 10 in FIG. 22 has a configuration identical to that illustrated in the second embodiment of FIG. 2 with a supply tube 295 serving to deliver liquid fuel from a container outlet 55 to the fuel reservoir 34 as by the feed tube 295 providing communication to a feed inlet port 253 on the anode end plate 14.

Throughout all the drawings, similar reference numerals are used to refer to similar elements.

The dispenser 300 includes a housing 310 adapted to be mounted vertically as to a wall. The housing 310 includes a front plate 390 and a rear plate 391 secured together. The front plate 390 and includes a motor casing 392 which carries internally a dispensing motor 382. The motor casing 392 carries a forwardly open socket 308. The dispenser 300 has a replaceable unit 312 which comprises both the supply container 54 and a pump 320. The replaceable unit 312 is adapted to be removably coupled to the housing 310 by forward and rearward movement with the container 54 removably supported on a support shelf 332 of the front plate and the dispensing pump 320 removably engaged within the socket 308. A feed tube 340 connects the dispensing outlet 338 of the supply container 54 with the pump 320. A one-way inlet valve 336 permits flow from the container 54 to the pump 320. When the replaceable unit 312 is coupled to the housing 310, the pump 320 is operatively connected to the electrical motor 382 such that operation of the dispensing motor 382 drives the dispensing pump 320 to dispense liquid as from an outlet 344 onto a person's hand disposed underneath the outlet 344 but not shown. Below the motor casing 392, the front plate 390 carries a sensing mechanism 336 to sense the presence of a user's hand underneath the outlet 344 and to thereby as suitably controlled by the controller 47 to dispense the cleaning fluid from the container 54 onto a person's hand.

Between the front plate 390 and the rear plate 391, a cavity 393 is schematically shown which extends downwardly past the lower end of the front plate 390 where the cavity 393 opens forwardly. A protective rigid wire screen 394 extends between the rear plate 391 and the front plate 390 below the front plate 390 in front of the cavity 393 to permit air flow into and out of the cavity 393. Within the cavity 393 below the front plate 390, the fuel cell arrangement 10 is provided with the anode end plate 14 fixedly secured to the rear plate 291 and carrying the cathode end plate 15 forwardly thereof. The cavity 393 is sized so as to accommodate all of the components of the fuel cell arrangement 10 providing sufficient room for the components such as those indicated in FIGS. 3 to 17 as the air closure cover 50, the cover motor 52, the linkage assembly 53 and the pump motor 48, however, not shown on FIG. 22. The wire screen 394 provides for free flow of atmospheric air into and out of the cavity 393. The controller 47 and the electrical power storage device 46 are schematically illustrated within the cavity 393 as electrically connected to various elements including electrical connection to the anode and cathode of the fuel cell and the pump motor of the fuel cell as well as any other sensors that may be provided in conjunction with the fuel cell. The controller 47 is also connected to the dispensing motor 382 and the sensing mechanism 336 to control operation of the fluid dispenser 300. It is to be appreciated that many other electrical components may be incorporated into the fluid dispenser 300 electrically connected to and controlled by the controller 47 including, for example, communication arrangements as, for example, for one or two-way communication as, for example, via a WiFi network with devices remote from the dispenser 300.

The fuel cell arrangement 10 generates electrical power which is stored in the electrical power storage device 46 and is hence used by the controller 47 to operate the dispenser 300 as by sensing the presence of a user's hand with the sensing mechanism 336 and, when a user's hand is sensed, to operate the motor 382 to dispense a predetermined dose of fluid. When fluid within the supply container 54 is exhausted, the replaceable unit 312 may be removed and replaced by another unit. In such replacement, a quick connect and disconnect arrangement may be provided between the supply tube 295 and the container outlet 55.

In FIG. 22, the fluid within the container 54 is dispensed directly onto a person's hand to serve as a hand cleaning fluid and, as well, is delivered directly to the fuel cell as a fuel for the fuel cell. Preferred fuels are isopropanol and water mixtures, preferably consisting merely of isopropanol and water without other components or any impurities which would impede the operation of the fuel cell or be detrimental to contact with a person's hand. Preferred mixtures consist of 10% to 90% isopropanol and 90% to 10% water, more preferably 40% to 90% isopropanol and 60% to 10% water. The other ranges of isopropanol and water fuels discussed with reference to the earlier embodiments are useful in the embodiment of FIG. 22, however, with a preferred liquid comprising 65% to 75% isopropanol and 35% to 25% water.

Reference is made to FIG. 23 which illustrates a fourth embodiment in accordance with the present invention in which a hand cleaning fluid dispenser incorporates a fuel cell arrangement 10. The embodiment of FIG. 23 is identical to the embodiment of FIG. 22 but for the exception that the fuel supply container 54 is provided as a separate container from a container 316 of fluid to be dispensed by the fluid dispenser 300 onto a person's hand, and a discharge pump 400 is provided communicating by a discharge passageway 401 with the fluid reservoir 34 for the discharge of fuel from the fluid reservoir 35 via a passageway 402 into the dispensing container 316. In the arrangement of FIG. 23, the supply container 54 is filled with the isopropanol and water fuel and the container 316 may be filled with the same or a different liquid or fluid.

In the embodiments of FIGS. 22 and 23, the supply container 54 may be a rigid container open to the atmosphere or may comprise a collapsible container, for example, having the fuel within a sealed flexible plastic bag. Similarly, the dispensing fluid container 316 in FIG. 23 may comprise a rigid container with some form of vacuum relief within the container or a collapsible container.

The particular nature of the dispenser into which a fuel cell arrangement 10 in accordance with the present invention may be incorporated is not limited. Such fluid dispensers may serve many purposes. In the context of the dispenser being a dispenser of cleaning fluids, it is particularly advantageous if the fuel may serve a dual purpose of acting, on one hand, as a cleaning liquid for use in cleaning and, on the other hand, for use as a fuel in the fuel cell, however, this is not necessary.

In accordance with the embodiments of the dispensers illustrated in FIG. 18, the liquid fuel which is provided to the fuel cell is recycled within the fuel cell and is not used as a cleaning fluid.

In accordance with the embodiment of the dispenser illustrated in FIG. 23, the liquid fuel which is provided to the fuel cell is not only recycled within the fuel cell but is also delivered to the dispensing container 316 to be dispensed with the fluid in the dispensing container 316 onto the person's hand and thus also used as the cleaning fluid.

The dispenser of FIG. 23 could similarly be configured to be similar to the embodiment of FIG. 18 by eliminating the discharge pump 400, the discharge passageway 401 and the passageway 402 in FIG. 23, such that the liquid fuel which is provided to the fuel cell is recycled within the fuel cell and is not used as a cleaning fluid. Conversely, the dispenser of FIG. 22 could be configured by providing a discharge pump 400, a discharge passageway 401 and a passageway 402 as in FIG. 19, such that the liquid fuel which is provided to the fuel cell is recycled not only within the fuel cell but also back to the supply container 54. The embodiment of FIG. 22 could also be modified to eliminate the fuel reservoir 34 and merely use the supply container 54 to supply fuel to the anode fuel chamber 28 with or without recycling.

In accordance with the present invention, fuel within the fuel cell may be discharged from the outlet 344 of the dispenser 300 with the various mechanisms being provided for transferring of the fuel within the fuel cell back to the supply container 54, the dispensing container 316 or otherwise to the dispenser 16 for discharge out the discharge outlet 344 or the dispenser 16. FIG. 23 shows an arrangement with two fluid containers, namely, the dispensing fluid container 316 and the supply container 54. An optional second dispensing pump 410 shown in dashed lines could be provided to deliver the fluid from the supply container 54 via tubes 411 and 412 also shown in dashed lines to the dispensing outlet 344. This second pump 410 could be controlled to dispense fluid to the dispensing outlet 344 simultaneously with the dispensing of the fluid from the dispensing fluid container 316, preferably with mixing prior to discharge, or separately. As one example, the fluid in the dispensing fluid container 316 might comprise components incompatible with use in the fuel cell such as alcohols other than isopropanol and/or moisturizers and fragrances which would poison the catalysts. The fluid in the supply container 54 could provide a high concentration of isopropanol in water and, on mixture with the fluid in the dispensing fluid container 316, a resultant dispensed fluid may have advantageously reduced concentrations of isopropanol. As another example, the fluid in the dispensing fluid container 316 might comprise substantially water with or without components incompatible with use in the fuel cell. The fluid in the supply container 54 could provide a high concentration of isopropanol in water, and, on mixture with the fluid in the dispensing fluid container 316, a resultant dispensed fluid may have advantageously selected proportions of isopropanol and water, with the dispenser having a capability to vary the proportions by varying the relative amounts of each fluid dispensed simultaneously.

In accordance with the present invention, with a fuel comprising a mixture of isopropanol and water, a reaction product of acetone will, with operation of fuel cells, come to be present with the isopropanol and water within the anode fuel chamber 28 and the fuel reservoir 34. The presence of acetone in relatively minor concentrations, for example, less than 30% by volume and, more preferably, less than 5% by volume, does not have a negative effect on a person's skin and thus can be tolerated in many applications where the dispensing fluid is to be used to clean a person's hand. Of course, when the liquid fuel is delivered from the fuel cell arrangement 10 into the dispensing fluid container 316, the acetone will be diluted with the fluid within the dispensing container 316. As well, the presence of acetone as, for example, up to 30% by volume is not detrimental for many other cleaning uses or other purposes.

While the invention has been described with reference to preferred embodiments, many modifications and variations will now occur to persons skilled in the art. For a definition of the invention, reference is made to the following claims.

We claim:

1. A method of use of a direct isopropanol fuel cell, comprising:
   providing a direct fuel cell comprising:
   a proton conducting or exchange membrane with a cathode side and an anode side, a cathode having a cathode catalyst on the cathode side of the membrane and an anode having an anode catalyst on the anode side of the membrane such that the membrane is arranged between the cathode and the anode, operating the direct fuel cell to generate electricity by supplying the anode with a liquid fuel and supplying the cathode with atmospheric air containing oxygen;

wherein the membrane comprising a sulfonated poly(aryl ketone) membrane, the anode catalyst is selected from the group of a platinum and ruthenium catalyst, a platinum and nickel catalyst, a platinum and gold catalyst, and mixtures thereof, the cathode catalyst comprises a platinum catalyst, the liquid fuel consisting of 10% to 90% by volume isopropanol, 90% to 10% by volume water and 0% to 30% by volume acetone in contact with the anode catalyst on the anode side of the membrane.

2. A method as claimed in claim 1 including operating the fuel cell at ambient temperatures, and providing atmospheric air at ambient temperature, and storing and supplying the liquid fuel at ambient temperatures.

3. A method as claimed in claim 2 wherein during operation of the fuel cell to generate electrical power, the atmospheric air and the cathode side of the membrane are passively in communication.

4. A method as claimed in claim 3 including operating the fuel cell such that the principal reaction at the anode catalyst is to oxidize a molecule of isopropanol into a molecule of acetone releasing two electrons.

5. A method as claimed in claim 4 including operating the fuel cell at electrical potentials between the anode and cathode sufficiently high that the principal reaction at the anode catalyst is to oxidize a molecule of isopropanol into a molecule of acetone releasing two electrons.

6. A method as claimed in claim 4 including operating the fuel cell to create acetone at the anode catalyst by the oxidation of isopropanol, providing for the acetone to pass through the membrane to cathode side of the membrane into communication with the atmospheric and evaporating the acetone into the atmosphere.

7. A method as claimed in claim 4 including:

providing a closure member movable between an open position permitting the atmospheric air and the cathode side of the membrane to be passively in communication and a closed position sealing the cathode side of the membrane from communication with the atmospheric air, and maintaining the closure member in the open position during operation of the fuel cell to generate electrical power, and maintaining the closure member in the closed position while the fuel cell is not subject to an electrical load.

8. A method as claimed in claim 7 including periodically maintaining the closure member in the closed position while the fuel cell is not subject to an electrical load to regenerate the cathode catalyst and/or the anode catalyst.

9. A method as claimed in claim 8 providing the fuel cell with an enclosed anode fuel chamber open to the anode side of the membrane and having an inlet at an upper end and a drain outlet at a lower end, an enclosed fuel reservoir located at a height below the anode fuel chamber, a drain passageway connecting the drain outlet of the anode fuel chamber with the fuel reservoir, and a fuel pump to draw fuel from the fuel reservoir and discharge the fuel into the anode fuel chamber via the inlet, operating the pump periodically to discharge the fuel into the anode fuel chamber, and permitting fuel in the anode fuel chamber to flow from the anode fuel chamber to the fuel reservoir via the drain passageway.

10. A method as claimed in claim 9 including during operation of the fuel cell to generate electrical power, operating the fuel cell in a cycle of operation including a first step of operating the pump for a first period of time to fill the anode fuel chamber with fuel and a second step of not operating the pump for a second period of time.

11. A method as claimed in claim 10 wherein while maintaining the closure member in the closed position while the fuel cell is not subject to an electrical load including:

operating the fuel cell in a cycle of operation including a first step of operating the pump for a first period of time to fill the anode fuel chamber with fuel, and a second step of not operating the pump for a second period of time, and wherein during the second step of not operating the pump monitoring the open cell potential between the anode and the cathode and recommencing the cycle with the first step of operating the pump when the open cell potential falls below a preselected rest threshold representative of a low hydration level of the membrane so as to maintain the hydration level of the membrane above a minimum threshold level.

12. A method as claimed in claim 11 wherein while maintaining the closure member in the closed position while the fuel cell is not subject to an electrical load including applying a revered electrical potential between the anode and the cathode to rejuvenate the anode and/or the cathode which may have become poisoned by products of reactions at the respective anode and cathode.

13. A method as claimed in claim 4 wherein the fuel cell comprises a membrane electrode assembly, the membrane electrode assembly comprising a layered assembly of an anode gas diffusion layer, an anode catalyst layer, the membrane, a cathode catalyst layer, and a cathode gas diffusion layer in that order.

14. A method as claimed in claim 13 wherein the membrane electrode assembly is between a cathode current collector on the cathode side of the membrane and an anode current collector on the anode side of the membrane.

15. A method as claimed in claim 2 wherein the anode catalyst consists of the platinum and ruthenium catalyst, and the cathode catalyst is a platinum black catalyst.

16. A method as claimed in claim 15 wherein the membrane comprises a sulfonated poly(aryl ketone) membrane.

17. A method as claimed in claim 12 including monitoring the open cell potential between the anode and the cathode to determine when the open cell potential falls below a preselected rest threshold, and operating of the pump when the open cell potential is below a preselected rest threshold.

18. A method as claimed in claim 16 wherein the fuel cell is operated at electrical potentials between the anode and cathode greater than 200 mV.

19. A method as claimed in claim 18 including operating the fuel cell at ambient temperatures in the range of plus 5 degrees Celsius to plus 40 degrees Celsius.

20. A method as claimed in claim 16 wherein the open cell potential is at least in part representative of a low hydration level of the membrane, and operating the fuel cell so as to maintain the hydration level of the membrane above a minimum threshold level.

* * * * *